US008565599B2

(12) United States Patent
Bouda

(10) Patent No.: US 8,565,599 B2
(45) Date of Patent: Oct. 22, 2013

(54) SYSTEM AND METHOD FOR TRANSMITTING OPTICAL MARKERS IN A PASSIVE OPTICAL NETWORK SYSTEM

(75) Inventor: Martin Bouda, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 1435 days.

(21) Appl. No.: 11/669,677

(22) Filed: Jan. 31, 2007

(65) Prior Publication Data

US 2008/0138069 A1     Jun. 12, 2008

Related U.S. Application Data

(60) Provisional application No. 60/869,508, filed on Dec. 11, 2006.

(51) Int. Cl.
*H04J 14/00*        (2006.01)

(52) U.S. Cl.
USPC ............... 398/68; 398/66; 398/67; 398/70; 398/72

(58) Field of Classification Search
USPC ........... 398/9–38, 75, 66, 67, 70, 71, 72, 100, 398/68
See application file for complete search history.

(56) References Cited

U.S. PATENT DOCUMENTS

| 4,555,810 A | 11/1985 | Khoe et al. |
| 5,285,305 A | 2/1994 | Cohen et al. |

(Continued)

FOREIGN PATENT DOCUMENTS

| EP | 1 028 331 A2 | 8/2000 |
| EP | 1 130 806 A2 | 9/2001 |
| EP | 1 434 375 A2 | 6/2004 |
| WO | WO 2007/047559 | 4/2007 |
| WO | WO 2007/081748 | 7/2007 |

OTHER PUBLICATIONS

International Searching Authority, "Notification of Transmittal of the International Search Report and the Written Opinion of the International Searching Authority, or the Declaration," (PCT Rule 44.1), International Application No. PCT/US2006/043188, mailed Mar. 14, 2007, 12 pages.

(Continued)

*Primary Examiner* — Danny Leung
*Assistant Examiner* — Daniel Dobson
(74) *Attorney, Agent, or Firm* — Baker Botts L.L.P.

(57) ABSTRACT

In accordance with the teachings of the present invention, a system and method for transmitting optical markers in a passive optical network (PON) system is provided. In a particular embodiment, a method for transmitting optical markers in a PON system includes transmitting a first optical marker signal, the first optical marker signal used to identify at least one of the first optical marker signal, an upstream wavelength corresponding to the first optical marker signal, and an optical network unit (ONU) type transmitting at the upstream wavelength corresponding to the first optical marker signal. The method also includes transmitting a second optical marker signal, the second optical marker signal used to identify at least one of the second optical marker signal, an upstream wavelength corresponding to the second optical marker signal, and an ONU type transmitting at the upstream wavelength corresponding to the second optical marker signal. The method further includes, at a distribution node of the PON, routing the first optical marker signal to a first set of one or more optical fibers in a PON each corresponding to a first upstream wavelength and routing the second optical marker signal to a second set of one or more optical fibers in the PON each corresponding to a second upstream wavelength.

10 Claims, 5 Drawing Sheets

(56) References Cited

U.S. PATENT DOCUMENTS

| | | | |
|---|---|---|---|
| 5,321,541 | A | 6/1994 | Cohen |
| 5,440,416 | A | 8/1995 | Cohen et al. |
| 5,579,421 | A | 11/1996 | Duvall et al. |
| 5,694,234 | A | 12/1997 | Darcie et al. |
| 5,926,298 | A | 7/1999 | Li |
| 6,144,472 | A | 11/2000 | Knox |
| 6,163,637 | A | 12/2000 | Zirngibl |
| 6,411,410 | B1 | 6/2002 | Wright et al. |
| 6,498,876 | B1 | 12/2002 | Liu et al. |
| 6,767,139 | B2 | 7/2004 | Brun et al. |
| 6,819,871 | B1 | 11/2004 | Baldwin et al. |
| 7,245,829 | B1 | 7/2007 | Sindile |
| 7,366,415 | B2 | 4/2008 | Lee et al. ............ 398/66 |
| 7,389,048 | B2 | 6/2008 | Kani et al. |
| 7,574,136 | B1* | 8/2009 | Zhang ............... 398/79 |
| 7,684,703 | B2 | 3/2010 | Harada ............ 398/68 |
| 2002/0196491 | A1 | 12/2002 | Deng et al. |
| 2003/0002102 | A1 | 1/2003 | Khalfallah et al. |
| 2004/0001718 | A1* | 1/2004 | Matthews et al. ............ 398/98 |
| 2004/0131357 | A1 | 7/2004 | Farmer et al. |
| 2004/0179855 | A1* | 9/2004 | Harada ............ 398/197 |
| 2004/0184806 | A1 | 9/2004 | Lee et al. |
| 2005/0123300 | A1* | 6/2005 | Kim et al. ........... 398/84 |
| 2005/0129404 | A1 | 6/2005 | Kim et al. |
| 2005/0158048 | A1 | 7/2005 | Sung et al. ............ 398/66 |
| 2005/0175343 | A1 | 8/2005 | Huang et al. |
| 2005/0175344 | A1 | 8/2005 | Huang et al. ............ 398/79 |
| 2005/0180689 | A1 | 8/2005 | Kozhevnikov et al. |
| 2006/0056849 | A1 | 3/2006 | Pamart et al. |
| 2006/0067692 | A1* | 3/2006 | Park et al. ............ 398/75 |
| 2006/0115271 | A1 | 6/2006 | Hwang et al. ............ 398/72 |
| 2006/0153567 | A1 | 7/2006 | Kim et al. ............ 398/72 |
| 2006/0177222 | A1* | 8/2006 | Beller ............... 398/38 |
| 2006/0222365 | A1 | 10/2006 | Jung et al. ............ 398/72 |
| 2007/0092249 | A1 | 4/2007 | Akasaka et al. |
| 2007/0092250 | A1 | 4/2007 | Bouda et al. |
| 2007/0092251 | A1 | 4/2007 | Bouda et al. |
| 2007/0092252 | A1 | 4/2007 | Bouda et al. |
| 2007/0092253 | A1 | 4/2007 | Bouda |
| 2007/0092254 | A1 | 4/2007 | Bouda |
| 2007/0092255 | A1 | 4/2007 | Bouda |
| 2007/0166037 | A1 | 7/2007 | Bouda et al. |
| 2007/0166043 | A1 | 7/2007 | Bouda |
| 2007/0183779 | A1 | 8/2007 | Bouda et al. ............ 398/72 |
| 2007/0280690 | A1 | 12/2007 | Bouda |
| 2007/0280691 | A1 | 12/2007 | Bouda |
| 2009/0080880 | A1* | 3/2009 | Lee et al. ............ 398/14 |

OTHER PUBLICATIONS

Langer et al, "Promising Evolution Paths for Passive Optical Access Networks," Proceedings of 2004 6th International Conference on Warsaw, Poland, Jul. 4-7, 2004, IEEE vol. 1, pp. 202-207.

International Searching Authority, "Notification of Transmittal of the International Search Report and the Written Opinion of the International Searching Authority, or the Declaration," (PCT Rule 44.1), International Application No. PCT/US2007/002955, mailed Jun. 28, 2007, 11 pages.

Wagner et al., "Technology and System Issues for a WDM-Based Fiber Loop Architecture," Journal of Lightwave Technology, IEEE Service Center, New York, NY, vol. 7, No. 11, Nov. 1, 1989, pp. 1759-1768.

Frigo et al., "A Wavelength-Division Multiplexed Passive Optical Network with Cost-Shared Components," IEEE Photonics Technology Letters, IEEE Service Center, Piscataway, NJ, vol. 4, No. 11, Nov. 1, 1994, pp. 1365-1367.

Oakley, "An Economic Way to See in the Broadband Dawn," Institute of Electrical and Electronics Engineers, Communications for the Information Age, Proceedings of the Global Telecommunications Conference and Exhibition (Globecom), New York, IEEE, vol. 3, Nov. 28, 1988, pp. 1574-1578.

International Searching Authority, "Notification of Transmittal of the International Search Report and the Written Opinion of the International Searching Authority, or the Declaration," (PCT Rule 44.1), International Application No. PCT/US2006/042224, mailed Mar. 5, 2007, 13 pages.

International Searching Authority, "Notification of Transmittal of the International Search Report and the Written Opinion of the International Searching Authority, or the Declaration," (PCT Rule 44.1), International Application No. PCT/US2006/040597, mailed Mar. 5, 2007, 15 pages.

International Searching Authority, "Notification of Transmittal of the International Search Report and the Written Opinion of the International Searching Authority, or the Declaration," (PCT Rule 44.1), International Application No. PCT/US2006/042220, mailed Mar. 12, 2007, 12 pages.

Zang et al., "A Review of Routing and Wavelength Assignment Approaches for Wavelength-Routed Optical WDM Networks," Optical Networks Magazine, SPIE, Bellingham, WA, US, vol. 1, No. 1, Jan. 2000, pp. 47-60.

Bouda, "System and Method for Protecting an Optical Network," U.S. Appl. No. 11/680,186, filed Feb. 28, 2007, 35 pps., 6 pps. drawings.

International Searching Authority, "Notification of Transmittal of the International Search Report and the Written Opinion of the International Searching Authority, or the Declaration," (PCT Rule 44.1), International Application No. PCT/US2007/000184, mailed Jul. 27, 2007, 13 pages.

Asatani et al., "A Field Trial of Fiber Optic Subscriber Loop Systems Utilizing Wavelength-Division Multiplexers," IEEE Transactions on Communications, IEEE Service Center, Piscataway, NJ, vol. COM-30, No. 9, Sep. 1982, pp. 2172-2184.

Cheng et al., "Integrated a Hybrid CATV/GPON Transport System Based on 1.31/1.49/1.55um WDM Transceiver Module," 2005 Quantum Electronics and Laser Science Conference, pp. 1678-1680, 2005.

Palacharla et al.., System and Method for Managing Communication in a Hybrid Passive Optical Network, filed May 2, 2007, U.S. Appl. No. 11/743,311, 50 pages, 6 pages of drawings.

International Searching Authority, "Notification of Transmittal of the International Search Report and the Written Opinion of the International Searching Authority, or the Declaration," (PCT Rule 44.1), International Application No. PCT/US2007/000189, mailed Jul. 18, 2007, 12 pages.

Son et al., "Bidirectional WDM Passive Optical Network for Simultaneous Transmission of Data and Digital Broadcast Video Service," Journal of Lightwave Technology, vol. 21, No. 8, Aug. 2003, pp. 1723-1727.

Ching et al., "Passive Optical Networks," Sharing the Fiber, Telecom Equipment-Wireline, Merrill Lynch, May 15, 2001, pp. 1-27.

Kuhlow et al., "AWG-Based Device for a WDM Overlay PON in the 1.5-µm Bank," IEEE Photonics Technology Letters, vol. 11, No. 2, Feb. 1999, pp. 218-220.

Feldman et al., "An Evaluation of Architectures Incorporating Wavelength Division Multiplexing for Broad-Bank Fiber Access," Journal of Lightwave Technology, vol. 16, No. 9, Invited Paper, Sep. 1998, pp. 1546-1559.

Giles et al., "Access PON Using Downstream 1550-nm WDM Routing and Upstream 1300-nm SCMA Combining Through a Fiber-Grating Route," IEEE Photonics Technology Letters, vol. 8, No. 11, Nov. 1996, pp. 1549-1551.

Hilbk et al., "High Capacity WDM Overlay on a Passive Optical Network," Electronic Letters, Nov. 7, 1996, vol. 32, No. 23, pp. 2162-2163.

Inoue et al., "Silica-based Arrayed-Waveguide Grating Circuit as Optical Splitter/Router," Electronic Letters, Apr. 27, 1995, vol. 31, No. 9, pp. 726-727.

Kashima, "Upgrade of Passive Optical Subscriber Network," Journal of Lightwave Technology, vol. 9, No. 1, Jan. 1991, pp. 113-120.

Lin, "Passive Optical Subscriber Loops with Multiaccess," Journal of Lightwave Technology, vol. 7, No. 11, Nov. 1989, pp. 1769-1777.

Moog Component Group, "(Mems)* Singlemode Fiber Optic Switch," FO5935, 2 pages, 2005.

Light Reading—Networking the Telecom Industry, PON & FTTx Update, Introduction, Aug. 8, 2005, Light Reading, Aug. 8, 2005, printed from web site Jan. 26, 2006, pp. 1-11, Retrieved from website Aug. 8, 2005.

(56) References Cited

OTHER PUBLICATIONS

ITU-T Telecommunication Standardization Sector of ITU-T, G.984.1, "Gigabit-Capable Passive Optical Network (GPON): General Characteristics," Series G: Transmission Systems and Media, Digital Systems and Networks, Digital Sections and Digital Line System—Optical Line Systems for Local and Access Networks, Mar. 2003, 20 pages.
ITU-T Telecommunication Standardization Sector of ITU-T, G.983.1, "Broadband Optical Access Systems Based on Passive Optical Networks (PON)," Series G: Transmission Systems and Media, Digital Systems and Networks, Digital Sections and Digital Line System—Optical Line Systems for Local and Access Networks, 124 pages, Jan. 2005, 123 pages.
ITU-T Telecommunication Standardization Sector of ITU-T, G.983.3, "A Broadband Optical Access System with Increased Service Capability by Wavelength Allocation," Series G: Transmission Systems and Media, Digital Systems and Networks, Digital Sections and Digital Line System—Optical Line Systems for Local and Access Networks, Mar. 2001, 59 pages.
ITU-T Telecommunication Standardization Sector of ITU-T, G.984.3, "Gigabit-Capable Passive Optical Network (G-PON): Transmission Convergence Layer Specification," Series G: Transmission Systems and Media, Digital Systems and Networks, Digital Sections and Digital Line System—Optical Line Systems for Local and Access Networks, Feb. 2004, 116 pages.
ITU-T Telecommunication Standardization Sector of ITU-T, G.984.3, Series G: Study Period 2005-2008, Updated Revised Amendment 1, : "Amendment to Gigabit-Capable Passive Optical Network (G-PON): Transmission Convergence Layer Specification (2004)," pp. 1-39, May 16-27, 2005.
Green, Paul E. Jr., Telecommunications Consultant, "Fiber-to-the-Home White Paper,", Feb. 21, 2003, pp. 1-21.
Park et al.; "Bidirectional Wavelength-Division-Multiplexing Self-Healing Passive Optical Network," Network Research Team, Telecommunications R&D Center, Samsung Electronics; 2005 Optical Society of America, 3 pages.
Son et al.; "Survivable Network Architectures for WDM PON;" Korea Advanced Institute of Science and Technology; 2005 Optical Society of America, 3 Pages, Mar. 6, 2005.
Smith, Stephen, "Business Class Services Over a GPON Network," Fujitsu Network Communications; 10 pages, Mar. 5, 2006.
Wang et al.; "A Novel Centrally Controlled Protection Scheme for Traffic Restoration in WDM Passive Optical Networks;" IEEE Photonics Technology Letters, vol. 17, No. 3; Mar. 2005, pp. 717-719.
Suzuki et al.; "A Reliable Wide-Area WDM-PON Using Wavelength-Shifted Protection Scheme;" Access Network Service Systems Laboratories, NTT Corporation; 2 pages, Sep. 25, 2005.
ITU—Telecommunication Standardization Sector Study Group 15; "Recommendation G.983.5: A Broadband Optical Access System with Enhanced Survivability (for consent);" Editor, Recommendation G.983.5; 45 pages, Oct. 15-26, 2001.
Phillips et al.; "Redundancy Strategies for a High Splitting Optically Amplified Passive Optical Network," Journal of Lightwave Technology, vol. 19, No. 2; pp. 137-149, Feb. 2001.
Chan et al.; "A Novel Bidirectional Wavelength Division Multiplexed Passive Optical Network with 1:1 Protection;" Friday Morning, OFC, vol. 2; pp. 779-781, 2003.
Sun et al.; "A Novel Star-Ring Protection Architecture Scheme for WDM Passive Optical Access Networks;" Department of Information Engineering, The Chinese University of Hong Kong; 3 pages, Mar. 6, 2005.
Hirth, Ryan, "1 Gbps to 10 Gbps Migration," Teknovus, Access the Future, IEEE Meeting, Jul. 2006, San Diego, CA, pp. 1-7.
Diouf, Leopold, "Next Generation Access (NGA)," An Alcatel-Lucent Contribution to NGA, FSAN Meeting, Munich, Germany, Feb. 7-9, 2007, pp. 1-30, published on FSAN website Jan. 31, 2007.

Handley et al., "A Comparison of WDM PON Architectures," Proceedings of the European Conference on Network and Optical Communications, Broadband Access and Technology. Amsterdam, IOS Press, NL, vol., part 1, pp. 141-147, Jan. 1, 1999.
International Searching Authority, "Notification of Transmittal of the International Search Report and the Written Opinion of the International Searching Authority, or the Declaration," (PCT Rule 44.1), International Application No. PCT/US2006/040318, mailed Feb. 14, 2007, 13 pages.
International Searching Authority, "Notification of Transmittal of the International Search Report and the Written Opinion of the International Searching Authority, or the Declaration," (PCT Rule 44.1), International Application No. PCT/US2006/040330, mailed Feb. 19, 2007, 13 pages.
International Searching Authority, "Notification of Transmittal of the International Search Report and the Written Opinion of the International Searching Authority, or the Declaration," (PCT Rule 44.1), International Application No. PCT/US2006/040605, 14 pages, mailed Feb. 14, 2007, 14 pages.
Bouda, "A Hybrid Passive Optical Network Using Shared Wavelengths," filed Feb. 3, 2006, 64 pps., 9 pps. drawings, U.S. Appl. No. 11/347,434.
Bouda, "A Distribution Node for a Wavelength-Sharing Network," filed Feb. 3, 2006, 64 pps., 9 pps. drawings, U.S. Appl. No. 11/347,612.
Bouda et al., "Distribution Components for a Wavelength-Sharing Network," filed Feb. 3, 2006, 69 pps., 9 pps. drawings, U.S. Appl. No. 11/347,585.
Bouda et al., "Upgradeable Passive Optical Network," filed Feb. 3, 2006, 66 pps, 9 pps. drawings, U.S. Appl. No. 11/347,446.
Palacharla et al., "System and Method for Managing Network Components in a Hybrid Passive Optical Network," filed Oct. 25, 2006, 43 pps, 4 drawings U.S. Appl. No. 11/552,696.
Bouda, "System and Method for Transmitting Traffic in a Plurality of Passive Optical Networks," U.S. Appl. No. 11/627,809, filed Jan. 26, 2007, 35 pps., 5 pps. drawings.
Bouda, "System and Method for Transmitting Upstream Traffic in an Optical Network," U.S. Appl. No. 11/426,875, filed Jun. 27, 2006, 49 pps., 5 pps. drawings.
Bouda, "System and Method for Managing Different Transmission Architectures in a Passive Optical Network," U.S. Appl. No. 11/627,793, 42 pps., 4 pps. drawings, Jan. 26, 2007.
Bouda, "System and Method for Distributing Traffic in an Optical Network," U.S. Appl. No. 11/426,879, filed Jun. 27, 2006, 43 pps., 5 pps. drawings.
Akasaka et al., "System and Method for Traffic Distribution in an Optical Network," U.S. Appl. No. 11/426,884, filed Jun. 27, 2006, 71 pps., 12 pps. drawings.
Bouda et al., "Method and System for Increasing Downstream Bandwidth in an Optical Network," filed Jan. 5, 2007, 42 pps., 10 pps. drawings, U.S. Appl. No. 11/620,144.
Bouda, "Distribution Node for an Optical Network," filed Jan. 4, 2007, 38 pps., 6 pps. drawings, U.S. Appl. No. 11/619,945.
Akasaka et al., "System and Method for Protecting an Optical Network," filed Dec. 11, 2006, 42 pps., 4 pps. drawings, U.S. Appl. No. 11/609,120.
International Searching Authority, "Notification of Transmittal of the International Search Report and the Written Opinion of the International Searching Authority, or the Declaration," (PCT Rule 44.1), International Application No. PCT/US2007/002851, mailed Aug. 21, 2007, 11 pages.
European Patent Office, European Search Report and Office Action, Application No. 07010686-9-2415, mailed Aug. 21, 2007, 14 pages.
Son et al., "Bidirectional Passive Optical Network for the Transmission of WDM Channels with Digital Broadcast Video Signals," Optical Society of America/Institute of Electrical and Electronics Engineers, Optical Fiber Communication Conference and Exhibit (OFC). Technical Digest, Post Conference Digest, Mar. 17-22, 2002, Trends in Optical and Photonic Series, pp. 767-768.

\* cited by examiner

SYSTEM AND METHOD FOR TRANSMITTING OPTICAL MARKERS IN A PASSIVE OPTICAL NETWORK SYSTEM

CROSS-REFERENCE TO RELATED APPLICATIONS

This application claims benefit under 35 U.S.C. §119(e) of U.S. Provisional Application Ser. No. 60/869,508 filed Dec. 11, 2006 by Bouda et al, and entitled System and Method for Transmitting Upstream WDM Traffic in a Passive Optical Network.

TECHNICAL FIELD

The present invention relates generally to communication systems and, more particularly, to a system and method for transmitting optical markers in a passive optical network system.

BACKGROUND

In recent years, a bottlenecking of communication networks has occurred in the portion of the network known as the access network. Bandwidth on longhaul optical networks has increased sharply through new technologies such as wavelength division multiplexing (WDM) and transmission of traffic at greater bit rates. Metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

Power-splitting passive optical networks (PSPONs) offer one solution to the bottleneck issue. PSPONs refer to typical access networks in which an optical line terminal (OLT) at the carrier's central office transmits traffic over one or two downstream wavelengths for broadcast via a remote node (RN) to optical network units (ONUs). In the upstream direction, ONUs typically time-share transmission of traffic in one wavelength. An ONU refers to a form of access node that converts optical signals transmitted via fiber to electrical signals that can be transmitted to individual subscribers and vice versa.

PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (Kb/s) and 1.5 megabits per second (Mb/s). Conversely, Broadband PONs (BPONs), which are example PSPONs, are currently being deployed to provide hundreds of megabits per second capacity shared by thirty-two users. Gigabit PONs (GPONs), another example of a PSPON, typically operate at speeds of up to 2.5 gigabits per second (Gb/s) by using more powerful transmitters, providing even greater bandwidth. Other PSPONs include, for example, asynchronous transfer mode PONs (APONs) and gigabit Ethernet PONs (GEPONs).

One current limitation of typical PSPONs is their limited reach. Reach generally refers to the maximum distance between the OLT and an ONU in a PON at which the OLT and the ONU can still communicate adequately. Since ONU transmitters are typically weaker than OLT transmitters, the limiting factor in extending reach in a PON has primarily been in the upstream direction and not in the downstream direction. Many network operators desire a solution for extending reach in the upstream direction in a PON that can maintain the ratio of ONUs per OLT.

Some solutions that have been proposed to extend the reach in the upstream direction are to replace ONU transmitters with stronger transmitters, to add a more sensitive receiver at the OLT, or to use amplifiers to amplify upstream signals. These solutions have not been particularly persuasive in the marketplace. Cost considerations have dissuaded many operators from implementing stronger ONU transmitters or a more sensitive receiver at the OLT. Also, operators have viewed amplifiers as requiring costly maintenance and as creating a greater number of points of failure in a PON, decreasing the attractiveness of such an option.

Yet another solution, a wavelength division multiplexing PON (WDMPON), would extend reach in the upstream (and downstream) direction. WDMPONs refer to access networks in which each ONU receives and transmits traffic over a dedicated downstream and upstream wavelength, respectively. In addition, each ONU is "colorless," meaning that it is interchangeable with any other ONU in any location in the PON. The power loss experienced by a signal in the upstream direction in a WDMPON is much less than in a PSPON, thereby extending reach in the upstream direction. Although WDMPONs would extend reach in the upstream direction, they would do so at a prohibitively high cost for many operators and would provide reach far exceeding current or near-future demand.

Because demand for greater reach in the upstream direction continues to grow (but not at a rate to justify adoption of WDMPONs in most cases), a need exists for cost-efficient solutions to extend the reach in PONs.

SUMMARY

One solution for extending the reach in a PON is to transmit upstream traffic at multiple wavelengths and route this traffic at a distribution node of the PON through a multiplexer, as opposed to a power splitter. Typical multiplexers can properly receive traffic at a particular input port in only a certain set of one or more wavelengths. Thus, for proper upstream transmission to take place, each of the multiplexer's input ports should be connected to downstream ONUs that transmit at the appropriate wavelength (or set of wavelengths) for that input port. One challenge that network operators may face when implementing a PON that routes upstream WDM traffic through a multiplexer at the distribution node is notifying whoever is deploying an ONU at a particular point in the network about the type of ONU that should be deployed at that point (i.e., the ONU transmitting at the proper upstream wavelength).

In accordance with the teachings of the present invention, a system and method for transmitting optical markers in a passive optical network (PON) system is provided. In a particular embodiment, a method for transmitting optical markers in a PON system includes transmitting a first optical marker signal, the first optical marker signal used to identify at least one of the first optical marker signal, an upstream wavelength corresponding to the first optical marker signal, and an optical network unit (ONU) type transmitting at the upstream wavelength corresponding to the first optical marker signal. The method also includes transmitting a second optical marker signal, the second optical marker signal used to identify at least one of the second optical marker signal, an upstream wavelength corresponding to the second optical marker signal, and an ONU type transmitting at the upstream wavelength corresponding to the second optical marker signal. The method further includes, at a distribution node of the PON, routing the first optical marker signal to a first set of one or more optical fibers in a PON each corresponding to a first upstream wavelength and routing the second optical marker signal to a second set of one or more optical fibers in the PON each corresponding to a second upstream wavelength.

Technical advantages of one or more embodiments of the present invention may include extending the reach in the upstream direction in a PON. By routing upstream traffic using a multiplexer instead of a primary power splitter at the RN, particular embodiments reduce the power loss experienced by upstream traffic, thereby extending the reach in the PON. Also, particular embodiments include a single receiver at the OLT to receive upstream traffic. By using a single receiver instead of multiple receivers (as in a WDMPON) at the OLT, a demultiplexer need not be used at the OLT. Not using a demultiplexer at the OLT reduces the power loss experienced by upstream traffic, thereby further extending the reach in the PON.

Another technical advantage of particular embodiments may include increasing upstream bandwidth in addition to extending reach in the PON. Particular embodiments may wavelength division multiplex upstream traffic. By doing so, these embodiments may transmit a larger amount of upstream traffic in the PON at one time. The OLT may demultiplex this traffic and receive the traffic in particular wavelengths at particular receivers.

Yet another technical advantage of particular embodiments may include transmitting optical markers downstream that indicate what type of ONU should be installed at a particular location in the PON. Since particular embodiments may require that only certain upstream wavelengths be transmitted at certain locations in the PON, only ONUs transmitting at a particular wavelength may be installed at particular locations in the PON. Transmitting optical markers downstream indicating the particular upstream wavelength that can be transmitted at a particular location may allow the proper ONU to be installed at that location. In particular embodiments, transmitting optical markers downstream may be more cost-efficient than using "colorless" ONUs, as in WDMPON.

In addition, another technical advantage of particular embodiments may include facilitating an upgrade in downstream capacity and reach by installing a PON architecture that can support both an upstream and downstream increase in capacity and reach. Thus, particular embodiments may provide increased upstream reach (and, optionally, bandwidth) and may be easily upgradeable (due to the architecture of the PON) to provide increased downstream reach and bandwidth.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
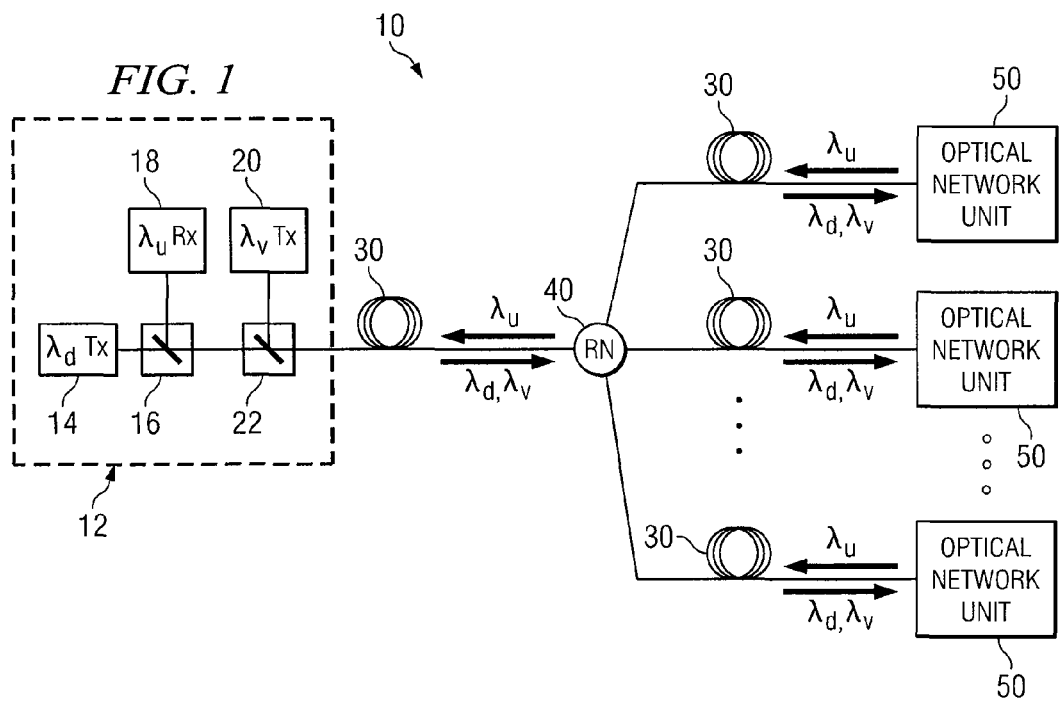
FIG. 1 is a diagram illustrating an example PSPON.

FIG. 1 is a diagram illustrating an example Power Splitting Passive Optical Network (PSPON) 10. Typically, PSPONs have been employed to address the bottlenecking of communications networks in the portion of the network known as the access network. In recent years, bandwidth on longhaul optical networks has increased sharply through new technologies such as wavelength division multiplexing (WDM) and transmission of traffic at greater bit rates. In addition, metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (Kb/s) and 1.5 megabits per second (Mb/s). Conversely, broadband PONs (BPONs) are currently being deployed to provide hundreds of megabits per second capacity shared by thirty-two users. Gigabit PONs (GPONs), which typically operate at speeds of up to 2.5 gigabits per second (Gb/s) by using more powerful transmitters, provide even greater bandwidth.

Referring back to PSPON 10 of FIG. 1, PSPON 10 includes an Optical Line Terminal (OLT) 12, optical fiber 30, a Remote Node (RN) 40, and Optical Network Units (ONUs) 50. PSPON 10 refers to typical access networks in which an optical line terminal (OLT) at the carrier's central office transmits traffic over one or two downstream wavelengths for broadcast to optical network units (ONUs). PSPON 10 may be an asynchronous transfer mode PON (APON), a BPON, a GPON, a gigabit Ethernet PON (GEPON), or any other suitable PSPON. A feature common to all PSPONs 10 is that the outside fiber plant is completely passive. Downstream signals transmitted by the OLT are passively distributed by the RN to downstream ONUs coupled to the RN through branches of fiber, where each ONU is coupled to the end of a particular branch. Upstream signals transmitted by the ONUs are also passively forwarded to the OLT by the RN.

OLT 12, which may be an example of an upstream terminal, may reside at the carrier's central office, where it may be coupled to a larger communication network. OLT 12 includes a transmitter 14 operable to transmit traffic in a downstream wavelength, such as $\lambda_d$, for broadcast to all ONUs 50, which may reside at or near customer sites. OLT 12 may also include a transmitter 20 operable to transmit traffic in a second downstream wavelength $\lambda_v$ (which may be added to $\lambda_d$) for broadcast to all ONUs 50. As an example, in typical GPONs, $\lambda_v$ may carry analog video traffic. Alternatively, $\lambda_v$ may carry digital data traffic. OLT 12 also includes a receiver 18 operable to receive traffic from all ONUs 50 in a time-shared upstream wavelength, $\lambda_u$. OLT 12 may also comprise filters 16 and 22 to pass and reflect wavelengths appropriately.

It should be noted that, in typical PSPONs, downstream traffic in $\lambda_d$ and $\lambda_v$ is transmitted at a greater bit rate than is traffic in $\lambda_u$, as PSPONs typically provide lower upstream bandwidth than downstream bandwidth. Also, downstream transmitters are typically more powerful than upstream transmitters, and thus, downstream reach is greater than upstream reach. It should also be noted that "downstream" traffic refers to traffic traveling in the direction from the OLT (or upstream terminal) to the ONUs (or downstream terminals), and "upstream" traffic refers to traffic traveling in the direction from the ONUs (or downstream terminals) to the OLT (or upstream terminal). It should further be noted that $\lambda_d$ may include the band centered around 1490 m, $\lambda_v$ may include the band centered around 1550 nm, and $\lambda_u$ may include the band centered around 1311 nm in particular PSPONs.

Optical fiber 30 may include any suitable fiber to carry upstream and downstream traffic. In certain PSPONs 10, optical fiber 30 may comprise, for example, bidirectional optical fiber. In other PSPONs 10, optical fiber 30 may comprise two distinct fibers.

RN 40 of PSPON 10 (which may also generally be referred to as a distribution node) comprises any suitable power splitter, such as an optical coupler, and connects OLT 12 to ONUs 50. RN 40 is located in any suitable location and is operable to split a downstream signal such that each ONU 50 receives a copy of the downstream signal. Due to the split and other possible power losses, each copy forwarded to an ONU has less than 1/N of the power of the downstream signal received by RN 40, where N refers to the number of ONUs 50. In addition to splitting downstream signals, RN 40 is also operable to combine into one signal upstream, time-shared signals transmitted by ONUs 50. RN 40 is operable to forward the upstream signal to OLT 12.

ONUs 50 (which may be examples of downstream terminals) may include any suitable optical network unit or optical network terminal (ONT) and generally refer to a form of access node that converts optical signals transmitted via fiber to electrical signals that can be transmitted to individual subscribers and vice versa. Subscribers may include residential and/or commercial customers. Typically, PONs 10 have thirty-two ONUs 50 per OLT 12, and thus, many example PONs may be described as including this number of ONUs. However, any suitable number of ONUs per OLT may be provided. ONUs 50 may include triplexers that comprise two receivers to receive downstream traffic (one for traffic in $\lambda_d$ and the other for traffic in $\lambda_v$) and one transmitter to transmit upstream traffic in $\lambda_u$. The transmission rate of the ONU transmitter is typically less than the transmission rate of the OLT transmitter (due to less demand for upstream capacity than for downstream capacity). Also, the power of the ONU transmitter is typically less than the power of the OLT transmitter, and thus, upstream reach is less than downstream reach. Each ONU 50 is operable to process its designated downstream traffic and to transmit upstream traffic according to an appropriate time-sharing protocol (such that the traffic transmitted by one ONU in $\lambda_u$ does not collide with the traffic of other ONUs in $\lambda_u$).

In operation, transmitter 14 of OLT 12 transmits downstream traffic for broadcast to ONUs 50 in $\lambda_d$. Transmitter 20 of OLT 12 may also transmit downstream analog video traffic for broadcast to ONUs 50 in $\lambda_v$. Traffic in $\lambda_d$ passes filter 16 and is combined with $\lambda_v$ at filter 22 (which passes $\lambda_d$ and reflects $\lambda_v$). The combined traffic then travels over optical fiber 30 to RN 40. RN 40 splits the downstream traffic into a suitable number of copies and forwards each copy to a corresponding ONU 50. Each ONU 50 receives a copy of the downstream traffic in $\lambda_d$ and $\lambda_v$ and processes the signal. Suitable addressing schemes may be used to identify which traffic is destined for which ONU 50.

In the upstream direction, each ONU 50 may transmit upstream traffic in $\lambda_u$ B along fiber 30 according to a suitable time-sharing protocol (such that upstream traffic does not collide). RN 40 receives the upstream traffic from each ONU 50 and combines the traffic from each ONU 50 into one signal (at, e.g., the RN's power splitter). RN 40 then forwards the combined traffic over fiber 30 to OLT 12. At OLT 12, the combined traffic is passed by filter 22 and reflected by filter 16 to receiver 18. Receiver 18 receives the signal and processes it.

One current limitation of typical PSPONs is their limited reach. Reach generally refers to the maximum distance between the OLT and an ONU in a PON at which the OLT and the ONU can still communicate adequately. Since ONU transmitters are typically weaker than OLT transmitters, the limiting factor in extending reach in a PON has primarily been in the upstream direction and not in the downstream direction. Many network operators desire a solution for extending reach in the upstream direction in a PON.

One solution that has been proposed is to extend the reach in the upstream direction by either replacing ONU transmitters with stronger transmitters or by using amplifiers to amplify upstream signals. Neither of these options has been persuasive in the marketplace. Cost considerations have dissuaded many operators from implementing stronger ONU transmitters. Also, operators have viewed amplifiers as requiring costly maintenance and as creating a greater number of points of failure in a PON, decreasing the attractiveness of such an option.

Yet another solution, a wavelength division multiplexing PON (WDMPON), would extend reach in the upstream (and downstream) direction. WDMPONs refer to access networks in which each ONU receives and transmits traffic over a dedicated downstream and upstream wavelength, respectively. In addition, each ONU is "colorless," meaning that it is interchangeable with any other ONU in any location in the PON. The power loss experienced by a signal in the upstream direction in a WDMPON is much less than in a PSPON, thereby extending reach in the upstream direction. Although WDMPONs would extend reach in the upstream direction, they would do so at a prohibitively high cost for many operators and would provide reach far exceeding current or near-future demand.

Figure 2:
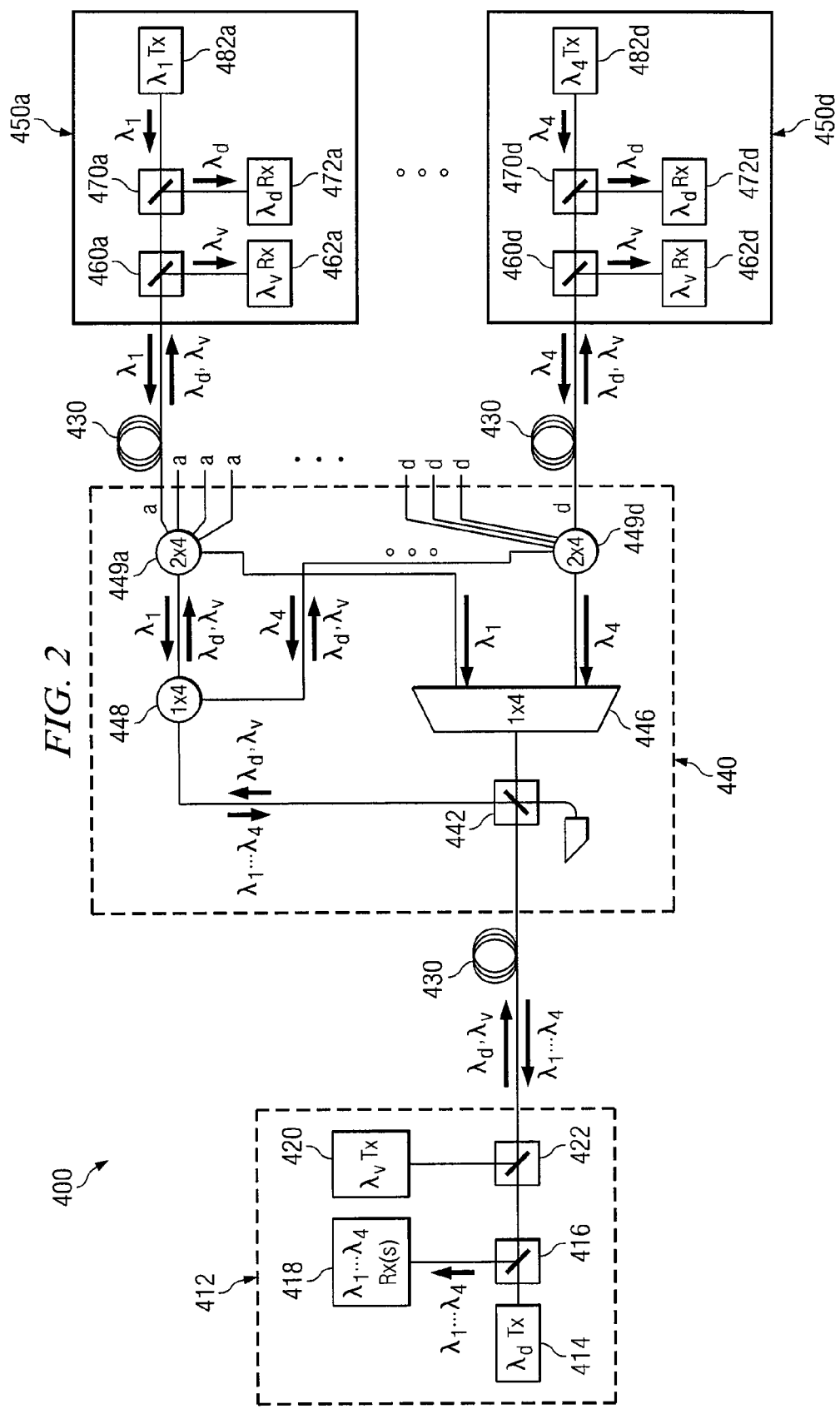
FIG. 2 is a diagram illustrating an example PSPON providing extended reach in the upstream direction according to a particular embodiment of the invention.

FIG. 2 is a diagram illustrating an example PSPON 400 providing extended reach in the upstream direction according to a particular embodiment of the invention. To provide extended reach, ONUs 450 time-share transmission of upstream traffic in a plurality of wavelengths, $\lambda_1$-$\lambda_4$. RN 440 routes this upstream traffic through a multiplexer 446 (and not through primary power splitter 448). OLT 412 receives the traffic at one or more receivers 418. By routing the upstream traffic through multiplexer 446 and not primary power splitter 448, the upstream traffic experiences less power loss, thereby increasing the reach in the upstream direction.

PSPON 400 comprises OLT 412, optical fiber 430, RN 440, and ONUs 450. OLT 412 may reside at the carrier's central office, where it may be coupled to a larger communication network. OLT 412 includes transmitters 414 and 420, receiver(s) 418, and filters 416 and 422. Transmitters 414 and 420 may be the same as transmitters 14 and 20 described above in conjunction with FIG. 1 and thus will not be described again in detail. It should be noted that, in particular embodiments, OLT 412 may also comprise any suitable amplifier (not illustrated) operable to increase the reach of downstream traffic.

Receiver(s) 418 comprise one or more suitable receivers operable to receive traffic in $\lambda_1$-$\lambda_4$. In particular embodiments, ONUs 450, though transmitting at four different wavelengths $\lambda_1$-$\lambda_4$, may time-share transmission of upstream traffic such that only a single ONU transmits at a single wavelength during a particular time-slot. In such embodiments, OLT 412 may include a single receiver operable to receive the traffic in each time-slot, carried in any one of $\lambda_1$-$\lambda_4$. Although upstream bandwidth may not be increased in such embodiments, upstream reach would be extended.

In alternative embodiments, an ONU 450 of two or more sets of ONUs 450a-450d may transmit upstream traffic in the same time-slot at $\lambda_1$-$\lambda_4$, respectively, which may be multiplexed at multiplexer 446 of RN 440, as described further below. In such embodiments, OLT 412 may include a demultiplexer (not illustrated) and multiple receivers corresponding to $\lambda_1$-$\lambda_4$. The demultiplexer may demultiplex $\lambda_1$-$\lambda_4$ and forward traffic in each wavelength to a corresponding receiver. In such embodiments, upstream bandwidth would be increased, and upstream reach would be extended. However, since upstream traffic may lose additional power at the demultiplexer in OLT 412, upstream reach may not be as great as in the case where a single receiver is used at OLT 412 (and traffic in $\lambda_1$-$\lambda_4$ is not transmitted in the same time-slot).

It should be noted that, in particular embodiments, $\lambda_1$-$\lambda_4$ may comprise fixed sub-bands of $\lambda_u$. In alternative embodiments, $\lambda_1$-$\lambda_4$ may comprise any other suitable wavelengths. It should further be noted that receiver(s) 418 may comprise one or more non-discriminating, spectrally broadband receivers in particular embodiments. It should further be noted that, in particular embodiments, any suitable number of upstream wavelengths may be transmitted, including, for example, a unique upstream wavelength for each ONU 650 (and PSPON 400 may be modified in any suitable manner to support such transmission).

Filter 416 is operable to receive the traffic in $\lambda_d$ from transmitter 414 and direct the traffic to filter 422. In the upstream direction, filter 416 is operable to receive the traffic in any one or more of $\lambda_1$-$\lambda_4$ from filter 422 and direct the traffic to receiver(s) 418. Filter 422 is operable to receive the traffic in $\lambda_d$ from filter 416 and the traffic in $\lambda_v$ from transmitter 420, combine the traffic, and forward the traffic to RN 440. In the upstream direction, filter 422 is operable to receive the traffic in any one or more of $\lambda_1$-$\lambda_4$ from RN 440 and direct the traffic to filter 416.

Optical fiber 430 may comprise any suitable fiber to carry upstream and downstream traffic. In particular embodiments, optical fiber 430 may comprise, for example, bidirectional optical fiber. In alternative embodiments, optical fiber 430 may comprise two distinct fibers.

RN 440 comprises filter 442, multiplexer 446, primary power splitter 448, and secondary power splitters 449. In the downstream direction, RN 440 is operable to receive traffic in $\lambda_d$ and $\lambda_v$, split the traffic into a plurality of copies at primary power splitter 448, and forward each copy to a particular ONU 450. In the upstream direction, RN 440 is operable to receive the traffic in $\lambda_1$-$\lambda_4$ at multiplexer 446 and forward this traffic to OLT 412.

It should be noted that, in alternative embodiments, RN 440 may comprise any other suitable component(s) operable to route the traffic appropriately. For example, in particular embodiments, a single optical device may split and multiplexed traffic (e.g., based on arrayed waveguide grating (AWG) technology). It should also be noted that although RN 440 is referred to as a remote node, "remote" refers to RN 440 being communicatively coupled to OLT 412 and ONUs 450 in any suitable spatial arrangement. A remote node may also generally be referred to as a distribution node.

Filter 442 may comprise any suitable filter operable to receive a downstream signal from OLT 412 comprising traffic in $\lambda_d$ and $\lambda_v$ and direct the signal to primary power splitter 448. In the upstream direction, filter 442 is operable to receive the traffic in $\lambda_1$-$\lambda_4$ from primary power splitter 448 and terminate the traffic. Filter 442 is also operable to receive the traffic in $\lambda_1$-$\lambda_4$ from multiplexer 446 and direct the traffic to OLT 412. Filter 442 is operable to forward the traffic in $\lambda_1$-$\lambda_4$ from multiplexer 446, but not the traffic in $\lambda_1$-$\lambda_4$ from primary power splitter 448. Although filter 442 includes only one filter in the illustrated embodiment, in alternative embodiments, filter 442 may comprise any suitable number of filters (coupled to optional switches) to facilitate an upgrade of the network.

Multiplexer 446 may comprise any suitable multiplexer/demultiplexer (and may be considered a wavelength router) and is operable to receive upstream traffic in one or more of wavelengths $\lambda_1$-$\lambda_4$ from secondary power splitters 449a-449d, respectively, and forward the traffic to filter 442. In particular embodiments, where upstream transmission is being time-shared such that only a single ONU transmits at a single wavelength during a particular time-slot, multiplexer 446 receives the traffic in the single wavelength in the particular time-slot from a corresponding secondary power splitter 449 and forwards the traffic to filter 442. In alternative embodiments, where an ONU from two or more sets of ONUs 450a-450d transmits at one of $\lambda_1$-$\lambda_4$, respectively, during a particular time-slot, multiplexer 446 is operable to receive the traffic in the multiple wavelengths in the particular time-slot from a corresponding set of secondary power splitters 449, multiplex the wavelengths into one signal, and forward the signal to filter 442.

In the illustrated embodiment, multiplexer 446 receives upstream traffic in $\lambda_1$-$\lambda_4$ at ports one through four, respectively, from secondary power splitters 449a-449d, respectively. However, it should be noted that, in alternative embodiments, multiplexer 446 may receive upstream traffic in any other suitable number of wavelengths and at any suitable set of ports. For example, in particular embodiments, multiplexer 446 may comprise a cyclic multiplexer or a multiplexer with a greater number of ports. Also, although one multiplexer 446 is illustrated in remote node 440 of FIG. 2, in alternative remote nodes, multiplexer 446 may comprise two or more separate multiplexers receiving upstream signals from one or more downstream sources and forwarding the traffic upstream.

Primary power splitter 448 may comprise any suitable power splitter, such as an optical coupler, operable to receive downstream traffic in $\lambda_d$ and $\lambda_v$ and split the traffic into four copies. The power of each copy may be less than one-fourth of the power of the original signal. Primary power splitter 448 is operable to forward each copy to a corresponding secondary power splitter 449a-449d. In the upstream direction, primary power splitter 448 is operable to receive traffic transmitted by ONUs 450 over $\lambda_1$-$\lambda_4$ from secondary power splitters 449a-449d, respectively, and combine this traffic into one signal. Primary power splitter 448 is further operable to forward this signal to filter 442 for termination. Although primary power splitter 448 comprises a 1×4 power splitter in the illustrated embodiment, any other suitable power splitter may be used in alternative embodiments.

Each secondary power splitter, one of 449a-449d, may comprise any suitable power splitter, such as an optical coupler, operable to receive a copy of downstream traffic in $\lambda_d$ and $\lambda_v$ from primary power splitter 448, split the copy into a suitable number of copies, and forward each resulting copy to an ONU in a corresponding set of downstream ONUs 450. In the upstream direction, each secondary power splitter 449 is operable to receive traffic transmitted at one of $\lambda_1$-$\lambda_4$ from each ONU 450 of a corresponding set of downstream ONUs 450 and combine the traffic from each ONU 450 into one signal. For example, secondary power splitter 449a is operable to receive traffic transmitted at time-shared $\lambda_1$ from ONUs 450a, secondary power splitter 449b is operable to receive traffic transmitted at time-shared $\lambda_2$ from ONUs 450b, secondary power splitter 449c is operable to receive traffic transmitted at time-shared $\lambda_3$ from ONUs 450c, and secondary power splitter 449d is operable to receive traffic transmitted at time-shared $\lambda_4$ from ONUs 450d.

Each secondary power splitter 449 is operable to split the combined upstream traffic into two copies and forward one copy to primary power splitter 448 and one copy to a corresponding port of multiplexer 446. The copy forwarded to primary power splitter 448, as described above, may be combined with other traffic from other ONUs 450 (and later terminated). The copy forwarded to multiplexer 446 may be forwarded by multiplexer 446 to filter 442 and directed to OLT 412. Although secondary power splitters 449 comprise 2×4 couplers in the illustrated embodiment, in alternative embodiments, secondary power splitters 449 may comprise any suitable couplers or combination of couplers, such as, for example, a 2×2 coupler coupled to two 1×2 couplers. Also, secondary power splitters 449 may split or combine any suitable number of signals.

Each ONU 450 (which may be an example of a downstream terminal) may comprise any suitable ONU or ONT. Each ONU 450 comprises a filter 460, receiver 462, filter 470, receiver 472, and transmitter 482. Each filter 460 may comprise any suitable filter operable to direct downstream traffic in $\lambda_v$ to receiver 462. Filter 460 is also operable to pass the traffic in $\lambda_d$ to filter 470 and to pass the upstream traffic in a corresponding one of $\lambda_1$-$\lambda_4$ to RN 440. Receiver 462 may comprise any suitable receiver operable to receive the traffic in $\lambda_v$ and to process the traffic. Each filter 470 may comprise any suitable filter operable to receive the traffic in $\lambda_d$ and direct it to receiver 472. Filter 470 is also operable to pass the upstream traffic in a corresponding one of $\lambda_1$-$\lambda_4$ to a corresponding filter 460. Receiver 472 may comprise any suitable receiver operable to receive the traffic in $\lambda_d$ and process the traffic.

Each transmitter 482 may comprise any suitable transmitter operable to transmit traffic at a corresponding one of $\lambda_1$-$\lambda_4$ in the upstream direction. Transmitters 482a of ONUs 450a time-share transmission at $\lambda_1$, transmitters 482b of ONUs 450b time-share transmission at $\lambda_2$ (not illustrated), transmitters 482c of ONUs 450c time-share transmission at $\lambda_3$ (not illustrated), and transmitters 482d of ONUs 450d time-share transmission at $\lambda_4$. As discussed above, all ONUs 450 may time-share transmission in particular embodiments such that only a single ONU 450 transmits at a single wavelength at a particular time-slot. In alternative embodiments, an ONU 450a, an ONU 450b, an ONU 450c, and/or an ONU 450d may transmit at $\lambda_1$-$\lambda_4$, respectively, in the same time-slot.

It should be noted that although four ONUs 450 are illustrated as being part of a group of ONUs 450 sharing an upstream wavelength in PSPON 400, any suitable number of ONUs 450 may be part of a group sharing an upstream wavelength. It should also be noted that any suitable number of ONUs 450 may be implemented in the network. It should further be noted that, in particular embodiments, only those ONUs 450 transmitting at a particular wavelength may be placed downstream of a particular port at multiplexer 446 of RN 440. Otherwise, the multiplexer port will not direct the wavelength properly.

In operation, in the downstream direction, transmitters 414 and 420 at OLT 412 transmit traffic at $\lambda_d$ and $\lambda_v$, respectively. Filter 416 receives the traffic in $\lambda_d$ and forwards the traffic to filter 422. Filter 422 receives the traffic in $\lambda_d$ and $\lambda_v$, combines the traffic into one signal, and forwards the signal over fiber 430 to RN 440. Filter 442 of RN 440 receives the traffic in $\lambda_d$ and $\lambda_v$ and directs the traffic to primary power splitter 448. Primary power splitter 448 receives the traffic in $\lambda_d$ and $\lambda_v$, splits the traffic into four copies, and forwards each copy to a corresponding secondary power splitter 449. Each secondary power splitter 449 receives a copy of $\lambda_d$ and $\lambda_v$, splits the copy into four copies, and forwards each resulting copy to an ONU 450 in a corresponding set of downstream ONUs 450. Each filter 460 receives a corresponding copy of traffic in $\lambda_d$ and $\lambda_v$, directs the traffic in $\lambda_v$ to a corresponding receiver 462, and directs the traffic in $\lambda_d$ to a corresponding filter 470. Receiver 462 receives the traffic in $\lambda_v$ and processes the traffic. Filter 470 receives the traffic in $\lambda_d$ and directs it to a corresponding receiver 472. Receiver 472 receives the traffic in $\lambda_d$ and processes the traffic.

In the upstream direction, sets of ONUs 450a-450d transmit at $\lambda_1$-$\lambda_4$, respectively. In particular embodiments, as described above, only a single ONU 450 transmits traffic in a particular time-slot (and all of ONUs 450 time-share time-slots), thereby increasing reach. In alternative embodiments, an ONU of one or more sets of ONU 450a-450d transmits in a particular time-slot (and ONUs of each set time-share time-slots), thereby increasing reach and upstream bandwidth. Thus, in these embodiments, ONUs 450a time-share transmission at $\lambda_1$, ONUs 450b time-share transmission at $\lambda_2$ (not illustrated), ONUs 450c time-share transmission at $\lambda_3$ (not illustrated), and ONUs 450d time-share transmission at $\lambda_4$.

Secondary power splitters 449a-449d receive the traffic in $\lambda_1$-$\lambda_4$, respectively. Each secondary power splitter 449 splits the received traffic into two copies and forwards one copy to multiplexer 446 and one copy to primary power splitter 448. Multiplexer 446 receives traffic in $\lambda_1$ at a first input port from secondary power splitter 449a, traffic in $\lambda_2$ at a second input port from secondary power splitter 449b (not illustrated), traffic in $\lambda_3$ at a third input port from secondary power splitter 449c (not illustrated), and traffic in $\lambda_4$ at a fourth input port from secondary power splitter 449d. In the embodiments in which a single ONU 450 transmits per time-slot, multiplexer 446 receives the traffic and forwards the traffic to filter 442. In the embodiments in which ONUs 450 transmit at $\lambda_1$-$\lambda_4$ (or a subset of $\lambda_1$-$\lambda_4$) per time-slot, multiplexer 446 receives the traffic, combines the traffic, and forwards the traffic to filter 442. Primary power splitter 448 receives traffic in $\lambda_1$-$\lambda_4$ from secondary power splitters 449, combines the traffic into one signal (when traffic in a plurality of $\lambda_1$-$\lambda_4$ is transmitted per time-slot), and forwards the traffic to filter 442. Filter 442 receives the traffic in the particular set of $\lambda_1$-$\lambda_4$ from multiplexer 446 and directs the traffic to OLT 412 over fiber 430. Filter 442 also receives the traffic in the particular set of $\lambda_1$-$\lambda_4$ from primary power splitter 448 and terminates the traffic in any suitable manner.

Filter 422 of OLT 412 receives the traffic in the particular set of $\lambda_1$-$\lambda_4$ and directs the traffic to filter 416. In the embodiments in which a single ONU 450 transmits per time-slot, filter 416 receives the traffic in the particular one of $\lambda_1$-$\lambda_4$ and directs the traffic to receiver 418. In the embodiments in which ONUs 450 transmit at two or more of $\lambda_1$-$\lambda_4$ per time-slot, filter 416 receives the traffic in the particular set of two or more wavelengths and forwards the traffic to a demultiplexer (not illustrated). The demultiplexer demultiplexes the wavelengths and forwards the traffic in each wavelength to a corresponding receiver 418. Receiver(s) 418 receive the traffic and process it.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

As described above, PSPON 400 may decrease the power loss experienced by upstream traffic by routing the traffic at RN 440 through multiplexer 446 (which may generate relatively little to no insertion loss in particular embodiments) and not primary power splitter 448 (which may generate greater than six decibels of insertion loss in particular embodiments). By decreasing the power loss experienced by upstream traffic, PSPON 400 provides extended reach. Also, PSPON 400 may provide increased upstream bandwidth in particular embodiments.

Figure 3:
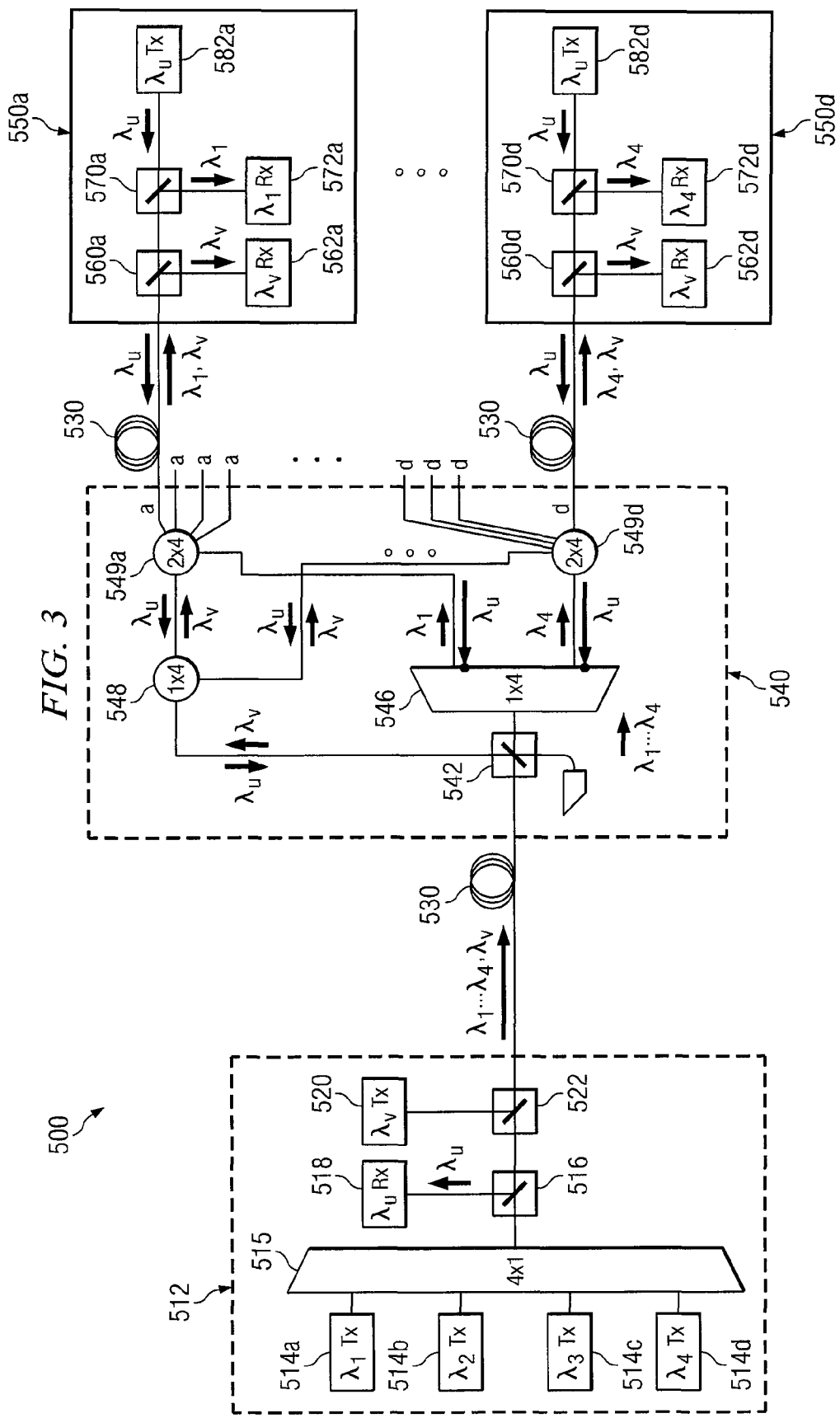
FIG. 3 is a diagram illustrating an example HPON.
Figure 4:
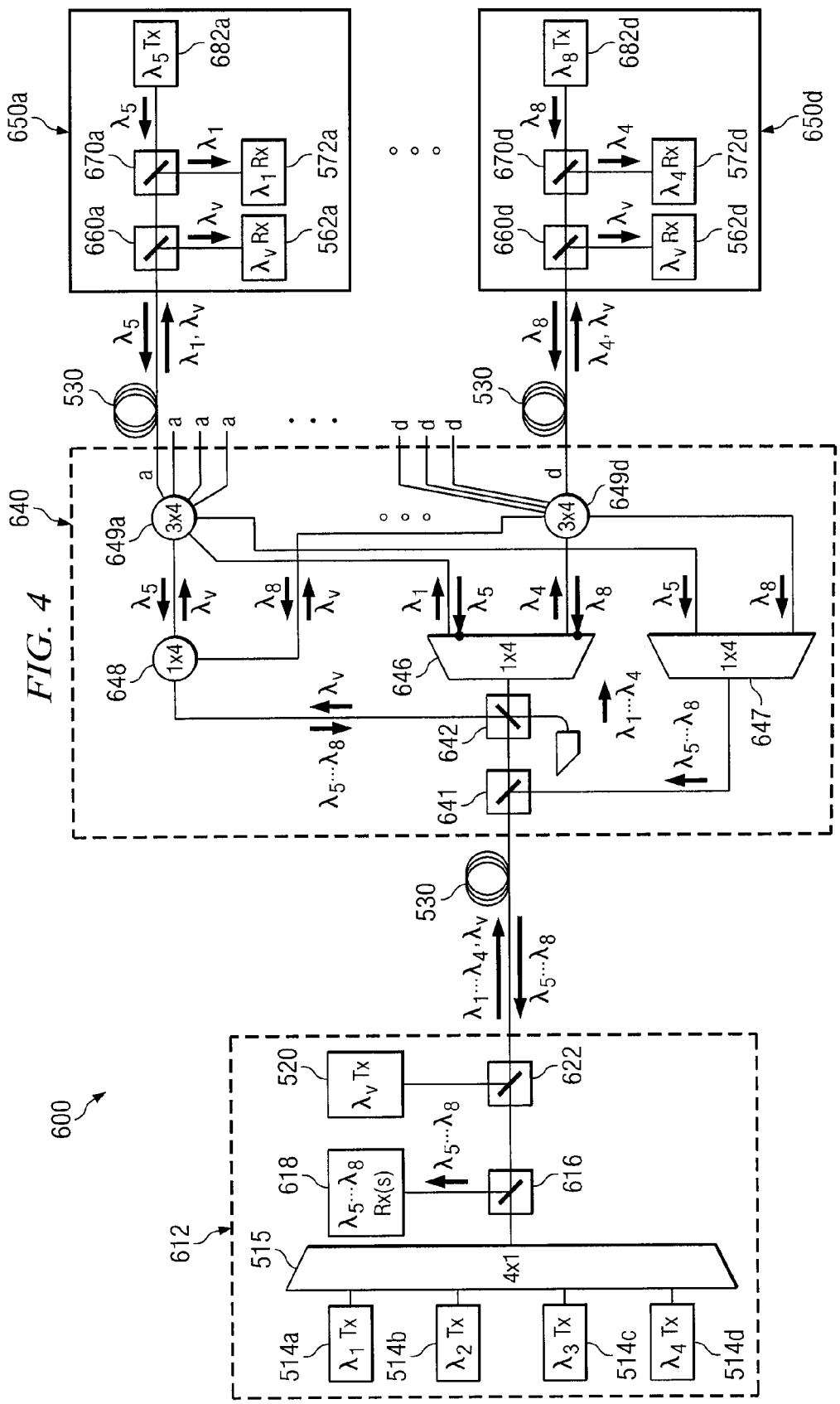
FIG. 4 is a diagram illustrating an example HPON providing extended reach in the upstream direction according to a particular embodiment of the invention.

Extended upstream reach and, optionally, increased upstream bandwidth can also be provided in hybrid PONs (HPONs), which are hybrids between PSPONs and WDM-PONs in the downstream direction. FIG. 3 illustrates an example HPON, and FIG. 4 illustrates an example HPON providing extended upstream reach and, optionally, increased upstream bandwidth.

FIG. 3 is a diagram illustrating an example HPON 500. Example HPON 500 comprises OLT 512, optical fiber 530, RN 540, and ONUs 550. Example HPON 500 provides greater downstream capacity than a PSPON by having groups of two or more ONUs 550 share downstream WDM wavelengths. It should be noted that an HPON generally refers to any suitable PON that is not a full WDMPON but that is operable to route downstream traffic in particular wavelengths to particular ONUs (and to transmit upstream traffic in any suitable manner). An HPON may include both an HPON that transmits downstream traffic in a plurality of wavelengths each shared by a group of wavelength-sharing ONUs (a WS-HPON, as is illustrated) and an HPON that transmits downstream traffic in a unique wavelength for each ONU (retaining PSPON characteristics in the upstream direction).

OLT 512 (which may be an example of an upstream terminal) may reside at the carrier's central office and comprises transmitters 514, multiplexer 515, filter 516 and receiver 518, and transmitter 520 and filter 522. Each transmitter 514a-514d may comprise any suitable transmitter and is operable to transmit traffic over a corresponding wavelength, $\lambda_1$-$\lambda_4$, respectively.

It should be noted that, $\lambda_1$-$\lambda_4$ are used in HPON 500 for illustrative purposes only and need not represent the same wavelengths as $\lambda_1$-$\lambda_4$ of PSPON 400, described above. Also, although four transmitters are illustrated in example HPON 500, any suitable number of transmitters may be included, transmitting traffic at any suitable number of wavelengths. It should also be noted that although example HPON 500 does not provide WDM for upstream traffic, it may be economical to implement transceivers (transmitter and receiver) in OLT 512, instead of only transmitters 514, in anticipation of a further upgrade to WDM upstream (e.g., an upgrade to particular embodiments of HPON 600 of FIG. 4).

Multiplexer 515 comprises any suitable multiplexer/demultiplexer (and may be considered a wavelength router) and is operable to combine the traffic in $\lambda_1$-$\lambda_4$ into one signal. In particular example networks, multiplexer 515 may comprise a cyclic multiplexer operable to receive and combine the traffic in more than one wavelength through each port. In other example networks, multiplexer 512 may be a typical N×1 multiplexer operable to receive only the traffic in one wavelength through each port.

Filter 516 comprises any suitable filter operable to receive the traffic in $\lambda_1$-$\lambda_4$ from multiplexer 515 and pass the traffic in $\lambda_1$-$\lambda_4$ to filter 522. In the upstream direction, filter 516 is operable to receive traffic in $\lambda_u$ and direct traffic in $\lambda_u$ to receiver 518. Receiver 518 may comprise any suitable receiver operable to receive and process upstream traffic from ONUs 550 carried over time-shared $\lambda_u$.

Transmitter 520 comprises any suitable transmitter and is operable to transmit traffic over $\lambda_v$ for eventual broadcast to all ONUs 550. Transmitter 520 is further operable to direct the traffic to filter 522. In particular embodiments, transmitter 520 may transmit analog video traffic over $\lambda_v$. In alternative embodiments, transmitter 520 may transmit digital data traffic. It should be noted that, although a single transmitter 520 is illustrated, OLT 512 may comprise any suitable number of transmitters operable to transmit traffic for eventual broadcast to all ONUs 550.

Filter 522 is operable to receive the traffic in $\lambda_v$ and the traffic in $\lambda_1$-$\lambda_4$ and combine the traffic. Filter 522 is also operable to direct the combined traffic over fiber 530 to RN 540. In the upstream direction, filter 522 is operable to receive traffic in $\lambda_u$ and direct the traffic in $\lambda_u$ to filter 516.

Optical fiber 530 may comprise any suitable fiber to carry upstream and downstream traffic. In certain HPONs 500, optical fiber 530 may comprise, for example, bidirectional optical fiber. In other HPONs 500, optical fiber 530 may comprise two distinct fibers, one carrying downstream traffic and the other carrying upstream traffic.

RN 540 comprises filter 542, multiplexer 546, primary power splitter 548, and secondary power splitters 549. RN 540 is operable to receive the traffic in $\lambda_1$-$\lambda_4$ and $\lambda_v$ from OLT 512, filter out and broadcast the traffic in $\lambda_v$, and demultiplex and forward the traffic in $\lambda_1$-$\lambda_4$ to the ONUs in corresponding groups of wavelength-sharing ONUs 550. RN 540 is further operable to receive from ONUs 550 upstream signals carried over time-shared wavelength $\lambda_u$, combine these signals, and forward the combined traffic in $\lambda_u$ to OLT 512. It should be noted that although RN 540 is referred to as a remote node, "remote" refers to RN 540 being communicatively coupled to OLT 512 and ONUs 550 in any suitable spatial arrangement. A remote node may also generally be referred to as a distribution node.

Filter 542 may comprise any suitable filter operable to receive a signal comprising traffic in $\lambda_1$-$\lambda_4$ and $\lambda_v$, pass the traffic in $\lambda_1$-$\lambda_4$ to multiplexer 546, and direct the traffic in $\lambda_v$ to primary power splitter 548. Although filter 542 in the illustrated example includes only one filter, filter 542 may comprise any suitable number of filters (coupled to optional switches) to facilitate an upgrade of the network. In the upstream direction, filter 542 is operable to receive the traffic in $\lambda_u$ and direct it toward OLT 512.

Multiplexer 546 may comprise any suitable multiplexer/demultiplexer (and may be considered a wavelength router) and is operable to receive the signal comprising the traffic in $\lambda_1$-$\lambda_4$ and demultiplex the signal. Each output port of multiplexer 546 is operable to forward the traffic in a corresponding one of $\lambda_1$-$\lambda_4$ to a corresponding secondary power splitter 549a-549d, respectively. In the upstream direction, multiplexer 546 is operable to receive and terminate the traffic in $\lambda_u$, as ONUs 550 of example HPON 500 time-share $\lambda_u$ (and do not transmit traffic over multiple upstream wavelengths).

Alternatively, multiplexer 546 may forward this traffic to filter 542 for suitable termination (where termination may be performed internally or externally).

It should be noted that multiplexer 546 may comprise a cyclic multiplexer or any other suitable type of multiplexer and may have any suitable number of ports. Also, although one multiplexer 546 is illustrated in remote node 540 of FIG. 3, in alternative remote nodes, multiplexer 546 may comprise two or more separate multiplexers receiving downstream signals from one or more upstream sources and forwarding the traffic downstream such that ONUs 550 share wavelengths. It should further be noted that the traffic in each wavelength may pass to a different secondary power splitter than that illustrated, the traffic in more than one wavelength may pass to a secondary power splitter, and/or multiplexer 546 may receive, multiplex, and pass traffic in less or more than four downstream wavelengths.

Primary power splitter 548 may comprise any suitable power splitter operable to receive the traffic in $\lambda_v$ and split the traffic into four copies. The power of each copy may be less than one-fourth of the power of the original signal $\lambda_v$. Primary power splitter 548 is operable to forward each copy to a corresponding secondary power splitter 549. In the upstream direction, primary power splitter 548 is operable to receive traffic transmitted by ONUs 550 over time-shared $\lambda_u$ from secondary power splitters 549 and combine this traffic into one signal. Primary power splitter 548 forwards the upstream signal to OLT 512. Primary power splitter 548 thus broadcasts the traffic in $\lambda_v$ in the downstream direction and combines traffic over time-shared $\lambda_u$ in the upstream direction. Although primary power splitter 548 is illustrated as a 1×4 power splitter, any suitable power splitter may be used.

Each secondary power splitter 549 may comprise any suitable power splitter, such as an optical coupler, operable to receive a signal from primary power splitter 548 and a signal from multiplexer 546, combine the two signals into one signal, split the combined signal into a suitable number of copies, and forward each copy to the ONUs in a corresponding wavelength-sharing group of ONUs 550 (each group of wavelength-sharing ONUs shares one of $\lambda_1$-$\lambda_4$ in the downstream direction). In the upstream direction, each secondary power splitter 549 is operable to receive traffic transmitted at $\lambda_u$ from each ONU 550 of a corresponding group of ONUs 550 and combine the traffic from each ONU 550 into one signal. Each secondary power splitter 549 is operable to split the combined upstream traffic into two copies and forward one copy to primary power splitter 548 and one copy to multiplexer 546. The copy forwarded to primary power splitter 548, as described above, is combined with other traffic from other ONUs 550 transmitted over time-shared $\lambda_u$. The copy forwarded to multiplexer 546 may be blocked or forwarded to filter 542 for suitable termination. Although secondary power splitters 549 are illustrated as 2×4 couplers in example HPON 500, secondary power splitters 549 may be any suitable coupler or combination of couplers (such as a 2×2 coupler coupled to two 1×2 couplers). Secondary power splitters 549 may split or combine any suitable number of signals.

Each ONU 550 (which may be an example of a downstream terminal) may comprise any suitable ONU or ONT. Each ONU 550 comprises a filter 560, receiver 562, filter 570, receiver 572, and transmitter 582. Each filter 560 may comprise any suitable filter operable to direct traffic in wavelength $\lambda_v$ (for example, analog video traffic) to receiver 562. Filter 560 is further operable to pass the traffic in the corresponding one of $\lambda_1$-$\lambda_4$ received at the ONU 550 to filter 570 and to pass the traffic in $\lambda_u$ to RN 540 in the upstream direction. Receiver 562 may comprise any suitable receiver operable to receive the traffic transmitted in $\lambda_v$ and process the traffic. Each filter 570 may comprise any suitable filter operable to receive the traffic in a corresponding one of $\lambda_1$-$\lambda_4$ and direct it to receiver 572. Filter 570 is further operable to pass the traffic in upstream wavelength $\lambda_u$ to corresponding filter 560 in the upstream direction. Receiver 572 may comprise any suitable receiver operable to receive the traffic transmitted in a corresponding one of $\lambda_1$-$\lambda_4$ and process the traffic. Receiver 572 may be operable to receive traffic in any one of $\lambda_1$-$\lambda_4$, providing flexibility in assigning (or re-assigning) an ONU 550 to a particular wavelength-sharing group. Each transmitter 582 may comprise any suitable transmitter operable to transmit traffic over $\lambda_u$ in the upstream direction, applying a suitable protocol to time-share $\lambda_u$ with the other ONUs 550.

It should be noted that although four ONUs 550 are illustrated as being part of a group of ONUs 550 in HPON 500, any suitable number of ONUs 550 may be part of a group sharing a downstream wavelength. In addition, there may be multiple groups each sharing a different downstream wavelength. For example, ONUs 550a may share $\lambda_1$, ONUs 550b (not illustrated) may share $\lambda_2$, ONUs 550c (not illustrated) may share $\lambda_3$, and ONUs 550d may share $\lambda_4$. Also, one or more ONUs 550 may be a part of more than one group in some networks. It should also be noted that any suitable number of ONUs 550 may be implemented in the network.

In operation, transmitters 514a-514d of OLT 512 transmit traffic at $\lambda_1$-$\lambda_4$, respectively, and forward the traffic to multiplexer 515. Multiplexer 515, which may include, for example, a cyclic multiplexer, combines the traffic in the four wavelengths into one signal and forwards the signal to filter 516. Filter 516 passes the downstream signal to filter 522. Transmitter 20 of OLT 512 also transmits traffic at $\lambda_v$ and forwards the traffic to filter 522. Filter 522 receives the traffic in $\lambda_1$-$\lambda_4$ and $\lambda_v$ and directs the traffic over optical fiber 530 to RN 540.

Filter 542 of RN 540 receives the signal and directs the traffic in (e.g., analog video) wavelength $\lambda_v$ to primary power splitter 548, allowing the traffic in $\lambda_1$-$\lambda_4$ to pass to multiplexer 546. Primary power splitter 548 receives the traffic in $\lambda_v$ and splits it into a suitable number of copies. In the illustrated embodiment, primary power splitter 548 splits the traffic in $\lambda_v$ into four copies, and forwards each copy to a corresponding secondary power splitter 549. Multiplexer 546 receives the signal comprising the traffic in $\lambda_1$-$\lambda_4$ and demultiplexes the signal into its constituent wavelengths. Multiplexer 546 then forwards the traffic in each wavelength along a corresponding fiber such that each secondary power splitter 549 receives the traffic in a corresponding one of $\lambda_1$-$\lambda_4$.

Each secondary power splitter 549 thus receives a copy of traffic in $\lambda_v$ from primary power splitter 548 and traffic in a corresponding one of $\lambda_1$-$\lambda_4$ from multiplexer 546, combines the traffic into one signal, and splits the signal into a suitable number of copies. In the illustrated embodiment, each secondary power splitter 549 splits the signal into four copies. In this way, the traffic (e.g., analog video) in wavelength $\lambda_v$ is broadcast to all ONUs 550 and a corresponding one of $\lambda_1$-$\lambda_4$ is transmitted to and shared by one or more groups of ONUs 550. In the illustrated embodiment, ONUs 550a share $\lambda_1$, ONUs 550b (not illustrated) share $\lambda_2$, ONUs 550c (not illustrated) share $\lambda_3$, and ONUs 550d share $\lambda_4$. It should be noted again that the groups of ONUs 550 sharing a wavelength may be different than those illustrated in FIG. 3, and groups of wavelength-sharing ONUs 550 may share more than one WDM wavelength in alternative networks.

After secondary power splitters 549 split the signal comprising the traffic in a corresponding one of $\lambda_1$-$\lambda_4$ and the traffic in $\lambda_v$ into four copies, secondary power splitters 549 forward each copy over fiber 530 such that the ONUs 550 coupled to the secondary power splitter 549 receive a copy. Filter 560 of each ONU 550 receives the signal and directs the traffic in $\lambda_v$ to receiver 562, which then processes the traffic carried over $\lambda_v$. Filter 560 passes the corresponding one of $\lambda_1$-$\lambda_4$ to filter 570. Filter 570 receives the traffic in the corresponding one of $\lambda_1$-$\lambda_4$ and directs the traffic to receiver 572 which then processes the traffic. Again, since each ONU 550 in a group may share one of $\lambda_1$-$\lambda_4$ with other ONUs 550 in the group, ONUs 550 may apply a suitable addressing protocol to process downstream traffic appropriately (e.g., to determine which portion of the traffic transmitted in the corresponding wavelength is destined for which ONU 550 in a group).

In the upstream direction, transmitter 582 of each ONU 550 transmits traffic over $\lambda_u$. Filters 570 and 560 receive the traffic in $\lambda_u$ and pass the traffic. The signal travels over fiber 530 to RN 540. Each secondary power splitter 549 of RN 540 receives traffic over time-shared $\lambda_u$ and combines the traffic from each ONU 550 in the corresponding group of ONUs 550. Again, since each ONU 550 transmits traffic over upstream wavelength $\lambda_u$, ONUs 550 may adhere to a suitable protocol to time-share $\lambda_u$ such that traffic from multiple ONUs 550 does not collide. After receiving and combining traffic over $\lambda_u$ into one signal, each secondary power splitter 549 splits the signal into two copies, forwarding one copy to multiplexer 546 and one copy to primary power splitter 548. As discussed above, multiplexer 546 of example network 500 may block $\lambda_u$ or forward $\lambda_u$ to filter 542 for suitable termination (internal or external to filter 542). Primary power splitter 548 receives traffic over $\lambda_u$ from each secondary power splitter 549, combines the traffic, and forwards the traffic to filter 542. Filter 542 receives the combined traffic in $\lambda_u$ and directs the traffic toward OLT 512. Fiber 530 carries the traffic in $\lambda_u$ to filter 522 of OLT 512. Filter 522 receives the traffic in $\lambda_u$ and passes the traffic to filter 516. Filter 516 receives the traffic in $\lambda_u$ and directs the traffic toward receiver 518. Receiver 518 receives the traffic and processes it.

FIG. 4 is a diagram illustrating an example HPON 600 providing extended reach in the upstream direction according to a particular embodiment of the invention. HPON 600 comprises OLT 612, fiber 530, RN 640, and ONUs 650. In a similar manner as ONUs 450 of FIG. 2, ONUs 650 provide extended reach by time-sharing transmission of upstream traffic in a plurality of wavelengths, $\lambda_5$-$\lambda_8$ RN 640 routes this traffic through multiplexer 647 (and not through primary power splitter 648). OLT 612 receives the traffic at one or more receivers 618. By routing the upstream traffic through multiplexer 647 and not primary power splitter 648, the upstream traffic experiences less power loss, thereby increasing the reach in the upstream direction.

OLT 612 (which may be an example of an upstream terminal) may reside at the carrier's central office and comprises transmitters 514, multiplexer 515, transmitter 520, filter 616, receiver(s) 618, and filter 622. Transmitters 514, multiplexer 515, and transmitter 520 have been described above in conjunction with FIG. 3 and thus will not be described again. It should be noted that, in particular embodiments, OLT 412 may also comprise any suitable amplifier (not illustrated) operable to increase the reach of downstream traffic.

Receiver(s) 618 comprise one or more suitable receivers operable to receive traffic in $\lambda_5$-$\lambda_8$. In particular embodiments, sets of ONUs 650a-650d, though transmitting at four different wavelengths $\lambda_5$-$\lambda_8$, respectively, may time-share transmission of upstream traffic such that only a single ONU 650 transmits during a particular time-slot. In such embodiments, OLT 612 may include a single receiver operable to receive the traffic in each time-slot, carried in any one of $\lambda_5$-$\lambda_8$. Although upstream bandwidth may not be increased in such embodiments, upstream reach would be extended.

In alternative embodiments, an ONU 650 of two or more sets of ONUs 650a-650d may transmit upstream traffic at $\lambda_5$-$\lambda_8$, respectively, in the same time-slot, which may be multiplexed at multiplexer 647 of RN 640, as described further below. In such embodiments, OLT 612 may include a demultiplexer (not illustrated) and multiple receivers corresponding to $\lambda_5$-$\lambda_8$. The demultiplexer may demultiplex $\lambda_5$-$\lambda_8$ and forward traffic in each wavelength to a corresponding receiver. In such embodiments, upstream reach would be extended, and upstream bandwidth would also be increased. However, since upstream traffic may lose additional power at the demultiplexer in OLT 612, upstream reach may not be as great as in the case where a single receiver is used at OLT 612 (and traffic in only one of $\lambda_5$-$\lambda_8$ is transmitted per time-slot).

It should be noted that $\lambda_5$-$\lambda_8$ may (but need not) be the same as $\lambda_1$-$\lambda_4$ transmitted in the downstream direction in FIGS. 3 and 4. Also, $\lambda_5$-$\lambda_8$ may (but need not) be the same as $\lambda_1$-$\lambda_4$ transmitted in the upstream direction in FIG. 2. It should also be noted that, in particular embodiments, receiver(s) 618 and transmitters 514 may be part of transceivers, and the illustrated PON architecture may be modified in any suitable manner to support such a configuration. It should further be noted that receiver(s) 618 may comprise one or more non-discriminating, spectrally broadband receivers in particular embodiments. Also, in particular embodiments, any suitable number of upstream wavelengths may be transmitted, including, for example, a unique upstream wavelength for each ONU 650 (and HPON 600 may be modified in any suitable manner to support such transmission).

Filter 616 is operable to receive the traffic in $\lambda_1$-$\lambda_4$ from multiplexer 515 and direct the traffic to filter 622. In the upstream direction, filter 616 is operable to receive the traffic in any one or more of $\lambda_5$-$\lambda_8$ from filter 622 and direct the traffic to receiver(s) 618. Filter 622 is operable to receive the traffic in $\lambda_1$-$\lambda_4$ from filter 616 and the traffic in $\lambda_v$ from transmitter 520, combine the traffic, and forward the traffic to RN 640. In the upstream direction, filter 622 is operable to receive the traffic in any one or more of $\lambda_5$-$\lambda_8$ from RN 640 and direct the traffic to filter 616. Optical fiber 530 has been described above in conjunction with FIG. 3 and thus will not be described again.

RN 640 comprises filters 641 and 642, multiplexers 646 and 647, primary power splitter 648, and secondary power splitters 649a-649d. RN 640 is operable to receive the traffic in $\lambda_1$-$\lambda_4$ and $\lambda_v$ from OLT 612, filter out and broadcast the traffic in $\lambda_v$, and demultiplex and forward the traffic in $\lambda_1$-$\lambda_4$ to the ONUs in corresponding groups of wavelength-sharing ONUs 650a-650d, respectively. In the upstream direction, RN 640 is operable to receive the traffic in $\lambda_5$-$\lambda_8$ from ONUs 650a-650d, respectively, at multiplexer 647 and forward this traffic to OLT 612. It should be noted that although RN 640 is referred to as a remote node, "remote" refers to RN 640 being communicatively coupled to OLT 612 and ONUs 650 in any suitable spatial arrangement. A remote node may also generally be referred to as a distribution node.

Filter 641 may comprise any suitable filter operable to receive a downstream signal comprising traffic in $\lambda_1$-$\lambda_4$ and $\lambda_v$ and pass the traffic in $\lambda_1$-$\lambda_4$ and $\lambda\lambda_v$ to filter 642. In the upstream direction, filter 641 is operable to receive the traffic in $\lambda_5$-$\lambda_8$ from multiplexer 647 and direct this traffic toward OLT 612. Although filter 641 in the illustrated example comprises a single filter, in alternative embodiments, filter 641 may comprise any suitable number of filters (coupled to optional switches) to facilitate an upgrade of the network (e.g., an upgrade in capacity).

Filter 642 may comprise any suitable filter operable to receive a signal comprising traffic in $\lambda_1$-$\lambda_4$ and $\lambda_v$ from filter 641, direct the traffic in $\lambda_1$-$\lambda_4$ to multiplexer 646, and direct the traffic in $\lambda_v$ to primary power splitter 648. In the upstream direction, filter 642 is operable to receive the traffic in $\lambda_5$-$\lambda_8$ from primary power splitter 648 (and optionally from multiplexer 646) and suitably terminate this traffic (internally or externally). Alternatively, filter 642 may be operable to forward the traffic in $\lambda_5$-$\lambda_8$ to filter 641 where it may be suitably terminated. Although filter 642 comprises a single filter in the illustrated embodiment, in alternative embodiments, filter 642 may comprise any suitable number of filters (coupled to optional switches) to facilitate an upgrade of the network (e.g., an upgrade in capacity).

Multiplexer 646 may comprise any suitable multiplexer/demultiplexer (and may be considered a wavelength router) and is operable to receive the downstream signal comprising the traffic in $\lambda_1$-$\lambda_4$ and demultiplex the signal. Each output port of multiplexer 646 is operable to forward the traffic in a corresponding one of $\lambda_1$-$\lambda_4$ to a corresponding secondary power splitter 649a-649d, respectively. In the upstream direction, multiplexer 646 is operable to receive the traffic in $\lambda_5$-$\lambda_8$ from secondary power splitters 649a-649d, respectively, and terminate this traffic (or forward this traffic to filter 642 for suitable termination).

It should be noted that multiplexer 646 may comprise a cyclic multiplexer or any other suitable type of multiplexer and may have any suitable number of ports. Also, although one multiplexer 646 is illustrated in remote node 640, in alternative remote nodes, multiplexer 646 may comprise two or more separate multiplexers receiving downstream signals from one or more upstream sources and forwarding the traffic downstream such that ONUs 650 share wavelengths. It should further be noted that the traffic in each wavelength may pass to a different secondary power splitter than that illustrated, the traffic in more than one wavelength may pass to a secondary power splitter, and/or multiplexer 646 may receive, multiplex, and pass traffic in less or more than four downstream wavelengths. In particular embodiments, multiplexer 646 may be the same as multiplexer 546 of FIG. 3.

Multiplexer 647 may comprise any suitable multiplexer/demultiplexer (and may be considered a wavelength router) and is operable to receive upstream traffic in one or more of wavelengths $\lambda_5$-$\lambda_8$ from secondary power splitters 649a-649d, respectively, and forward the traffic to filter 641. In particular embodiments, where upstream transmission is being time-shared such that only a single ONU 650 transmits during a particular time-slot, multiplexer 647 receives the traffic in the single wavelength in the particular time-slot from a corresponding secondary power splitter 649 and forwards the traffic to filter 641. In alternative embodiments, where an ONU of two or more sets of ONUs 650a-650d transmit at $\lambda_5$-$\lambda_8$, respectively, during a particular time-slot, multiplexer 647 is operable to receive the traffic in the multiple wavelengths in the particular time-slot from a corresponding set of secondary power splitters 649, multiplex the wavelengths into one signal, and forward the signal to filter 641.

In the illustrated embodiment, multiplexer 647 is operable to receive upstream traffic in $\lambda_5$-$\lambda_8$ at ports one through four, respectively, from secondary power splitters 649a-649d, respectively. However, it should be noted that, in alternative embodiments, multiplexer 647 may receive upstream traffic in any other suitable number of wavelengths and at any suitable set of ports. For example, in particular embodiments, multiplexer 647 may comprise a cyclic multiplexer or may comprise a greater number of ports. Also, although multiplexer 647 comprises a single multiplexer in the illustrated embodiment, in alternative embodiments, multiplexer 647 may comprise two or more separate multiplexers receiving upstream signals from one or more downstream sources and forwarding the traffic upstream. Also, multiplexers 646 and 647 may comprise a single multiplexer in particular embodiments.

Primary power splitter 648 may comprise any suitable power splitter operable to receive the traffic in $\lambda_v$ from filter 642 and split the traffic into four copies. The power of each copy may be less than one-fourth of the power of the original signal $\lambda_v$. Primary power splitter 648 is operable to forward each copy to a corresponding secondary power splitter 649. In the upstream direction, primary power splitter 648 is operable to receive traffic transmitted by ONUs 650 over $\lambda_5$-$\lambda_8$ from secondary power splitters 649, combine this traffic into one signal, and forward the signal to filter 642 for suitable termination. Primary power splitter 648 thus broadcasts downstream traffic in $\lambda_v$ and combines and forwards upstream traffic in $\lambda_5$-$\lambda_8$ for suitable termination. Although primary power splitter 648 is illustrated as a 1×4 power splitter, any suitable power splitter may be used in alternative embodiments.

Each secondary power splitter, one of 649a-649d, may comprise any suitable power splitter, such as an optical coupler, operable to receive a copy of downstream traffic in $\lambda_v$ from primary power splitter 648 and traffic in a corresponding one of $\lambda_1$-$\lambda_4$ from multiplexer 646, combine the traffic in $\lambda_v$ and $\lambda_1$-$\lambda_4$, split the combined traffic into a suitable number of copies, and forward each resulting copy to a corresponding set of ONUs 650. In the upstream direction, each secondary power splitter 649 is operable to receive traffic in a corresponding one of $\lambda_5$-$\lambda_8$ from each ONU 650 of a corresponding group of downstream ONUs 650 and combine the traffic into one signal. For example, secondary power splitter 649a is operable to receive traffic transmitted at time-shared $\lambda_1$ from ONUs 650a, secondary power splitter 649b is operable to receive traffic transmitted at time-shared $\lambda_2$ from ONUs 650b (not illustrated), secondary power splitter 649c is operable to receive traffic transmitted at time-shared $\lambda_3$ from ONUs 650c (not illustrated), and secondary power splitter 649d is operable to receive traffic transmitted at time-shared $\lambda_4$ from ONUs 650d.

Each secondary power splitter 649 is operable to split the combined upstream traffic into three copies and forward a first copy to primary power splitter 648, a second copy to multiplexer 646, and a third copy to multiplexer 647. The copy forwarded to primary power splitter 648, as described above, may be combined with other traffic from other ONUs 650 (and later terminated). The copy forwarded to multiplexer 646 may be terminated or forwarded to filter 642 for termination. The copy forwarded to multiplexer 647 may be combined with the copies from other secondary power splitters 649 in particular embodiments, forwarded to filter 641, and directed to OLT 612. Although secondary power splitters 649 comprise 3×4 couplers in the illustrated embodiment, in alternative embodiments, secondary power splitters 649 may comprise any other suitable couplers or combination of couplers (such as a 2×1 coupler coupled to a 2×4 coupler). Secondary power splitters 649 may split or combine any suitable number of signals and may reside in any suitable location in HPON 600.

Each ONU 650 (which may be an example of a downstream terminal) may comprise any suitable ONU or ONT. Each ONU 650 comprises receivers 562 and 572, filters 660 and 670, and transmitter 682. Receivers 562 and 572 have been described above in conjunction with FIG. 3 and thus will not be described again in detail. Each filter 660 may comprise any suitable filter operable to direct downstream traffic in $\lambda_v$ to receiver 562. Filter 660 is also operable to pass the traffic in a corresponding one of $\lambda_1$-$\lambda_4$ to filter 670. In the upstream direction, each filter 660 is operable to receive the traffic in a corresponding one of $\lambda_5$-$\lambda_8$ from a corresponding filter 670 and direct the traffic to RN 640.

Each filter 670 may comprise any suitable filter operable to receive the traffic in a corresponding one of $\lambda_1$-$\lambda_4$ from a corresponding filter 660 and direct the traffic to a corresponding receiver 572. In the upstream direction, each filter 670 is further operable to receive the traffic in a corresponding one of $\lambda_5$-$\lambda_8$ from a corresponding transmitter 682 and direct the traffic to a corresponding filter 660.

Each transmitter 682 may comprise any suitable transmitter operable to transmit traffic at a corresponding one of $\lambda_5$-$\lambda_8$ in the upstream direction. Transmitters 682a of ONUs 650a time-share transmission at $\lambda_5$, transmitters 682b of ONUs 650b time-share transmission at $\lambda_6$ (not illustrated), transmitters 682c of ONUs 650c time-share transmission at $\lambda_7$ (not illustrated), and transmitters 682d of ONUs 650d time-share transmission at $\lambda_8$. As discussed above, all ONUs 650 may time-share transmission in particular embodiments such that only a single ONU 650 transmits in a particular time-slot. In alternative embodiments, an ONU 650a, an ONU 650b, an ONU 650c, and/or an ONU 650d may transmit at $\lambda_1$-$\lambda_4$, respectively, in the same time-slot.

It should be noted that although four ONUs 650 are illustrated as being part of a group of ONUs 650 sharing an upstream wavelength in HPON 600, any suitable number of ONUs 650 may be part of a group sharing an upstream wavelength. It should also be noted that any suitable number of ONUs 650 may be implemented in the network. It should further be noted that, in particular embodiments, only those ONUs 650 transmitting at a particular wavelength may be placed downstream of a particular port of multiplexer 647, as discussed below in conjunction with FIG. 5.

In operation, in the downstream direction, transmitters 514a-514d and 520 at OLT 612 transmit traffic at $\lambda_1$-$\lambda_4$ and $\lambda_v$, respectively. Multiplexer 515 combines the traffic in $\lambda_1$-$\lambda_4$ and forwards the combined traffic to filter 616. Filter 616 receives the traffic in $\lambda_1$-$\lambda_4$ and forwards the traffic to filter 622. Filter 622 receives the traffic in $\lambda_1$-$\lambda_4$ from filter 616 and the traffic in $\lambda_v$ from transmitter 520, combines the traffic into one signal, and forwards the signal over fiber 530 to RN 640. Filter 641 of RN 640 receives the traffic in $\lambda_1$-$\lambda_4$ and $\lambda_v$ and forwards the traffic to filter 642. Filter 642 receives the traffic in $\lambda_1$-$\lambda_4$ and $\lambda_v$, directs the traffic in $\lambda_v$ to primary power splitter 648, and directs the traffic in $\lambda_1$-$\lambda_4$ to multiplexer 646. Primary power splitter 648 receives the traffic in $\lambda_v$ and splits it into a suitable number of copies. In the illustrated embodiment, primary power splitter 648 splits the traffic in $\lambda_v$ into four copies and forwards each copy to a corresponding secondary power splitter 649. Multiplexer 646 receives the signal comprising the traffic in $\lambda_1$-$\lambda_4$ and demultiplexes the signal into its constituent wavelengths. Multiplexer 646 then directs the traffic in $\lambda_1$-$\lambda_4$ to secondary power splitters 649a-649d, respectively.

Each secondary power splitter 649 receives a copy of traffic in $\lambda_v$ from primary power splitter 648 and traffic in a corresponding one of $\lambda_1$-$\lambda_4$ from multiplexer 646, combines the traffic into one signal, splits the signal into a suitable number of copies, and forwards each copy to a downstream ONU 650. In the illustrated embodiment, each secondary power splitter 649 splits the signal into four copies and forwards the four copies to downstream ONUs 450.

In this manner, the traffic (e.g., analog video) in $\lambda_v$ is broadcast to all ONUs 650 and a corresponding one of $\lambda_1$-$\lambda_4$ is transmitted to and shared by a group of ONUs 650. In the illustrated embodiment, ONUs 650a share $\lambda_1$, ONUs 650b (not illustrated) share $\lambda_2$, ONUs 650c (not illustrated) share $\lambda_3$, and ONUs 650d share $\lambda_4$. It should be noted that, in alternative embodiments, the groups of ONUs 650 sharing a particular wavelength may be different than those illustrated in FIG. 4, and groups of wavelength-sharing ONUs 650 may share more than one WDM wavelength.

Filter 660 of each ONU 650 receives a copy of the traffic in $\lambda_v$ and a corresponding one of $\lambda_1$-$\lambda_4$ from a corresponding secondary power splitter 649. Filter 660 then directs the traffic in $\lambda_v$ to receiver 562 (which then processes the traffic) and directs the traffic in the corresponding one of $\lambda_1$-$\lambda_4$ to filter 670. Filter 670 receives the traffic in the corresponding one of $\lambda_1$-$\lambda_4$ and directs the traffic to receiver 572 which then processes the traffic. Again, since each ONU 650 in a group may share one of $\lambda_1$-$\lambda_4$ with other ONUs 650 in the group, ONUs 650 may apply a suitable addressing protocol to process downstream traffic appropriately (e.g., to determine which portion of the traffic transmitted in the corresponding wavelength is destined for which ONU 650 in a group).

In the upstream direction, sets of ONUs 650a-650d transmit at $\lambda_5$-$\lambda_8$, respectively. In particular embodiments, as described above, a single ONU 650 transmits traffic in a particular time-slot (and all of ONUs 650 time-share time-slots), thereby increasing reach. In alternative embodiments, an ONU of two or more sets of ONU 650a-650d transmits in a particular time-slot (and ONUs of each set time-share time-slots), thereby increasing reach and upstream bandwidth. Thus, in these embodiments, ONUs 650a time-share transmission at $\lambda_5$ ONUs 650b time-share transmission at $\lambda_6$ (not illustrated), ONUs 650c time-share transmission at $\lambda_7$ (not illustrated), and ONUs 650d time-share transmission at $\lambda_8$.

Secondary power splitters 649a-649d receive the traffic in $\lambda_5$-$\lambda_8$, respectively. Each secondary power splitter 649 splits the received traffic into three copies and forwards one copy to multiplexer 646, one copy to multiplexer 647, and one copy to primary power splitter 648. Multiplexer 646 receives a copy of the traffic in $\lambda_5$ at a first input port, a copy of the traffic in $\lambda_6$ at a second input port, a copy of the traffic in $\lambda_7$ at a third input port, and a copy of the traffic in $\lambda_8$ at a fourth input port, and terminates the traffic (or forwards the traffic to filter 642 for suitable termination).

Multiplexer 647 receives a copy of the traffic in $\lambda_5$ at a first input port, a copy of the traffic in $\lambda_6$ at a second input port, a copy of the traffic in $\lambda_7$ at a third input port, and a copy of the traffic in $\lambda_8$ at a fourth input port. In the embodiments in which a single ONU 650 transmits per time-slot, multiplexer 647 receives the traffic and forwards the traffic to filter 641. In the embodiments in which an ONU 650 from two or more sets of ONUs 650a-650d transmit at $\lambda_5$-$\lambda_8$, respectively, in the same time-slot, multiplexer 647 receives the traffic, combines the traffic, and forwards the traffic to filter 641.

Primary power splitter 648 receives copies of the traffic in $\lambda_5$-$\lambda_8$ from secondary power splitters 649a-649d, respectively, combines the traffic into one signal (when traffic in a plurality of $\lambda_5$-$\lambda_8$ is transmitted per time-slot), and forwards the traffic to filter 642. Filter 642 receives the traffic in the particular set of $\lambda_5$-$\lambda_8$ from primary power splitter 648 (and optionally from multiplexer 646) and terminates the traffic. Filter 641 receives the traffic in the particular set of $\lambda_5$-$\lambda_8$ from multiplexer 647 and forwards the traffic to OLT 612.

Filter 622 of OLT 612 receives the traffic in the particular set of $\lambda_5$-$\lambda_8$ and directs the traffic to filter 616. In the embodiments in which a single ONU 650 transmits per time-slot, filter 616 receives the traffic in the particular one of $\lambda_5$-$\lambda_8$ and forwards the traffic to receiver 618. In the embodiments in which an ONU from two or more sets of ONUs 650a-650d transmit at $\lambda_5$-$\lambda_8$, respectively, in the same time-slot, filter 616 receives the traffic in the particular set of two or more wavelengths and forwards the traffic to a demultiplexer (not illustrated). The demultiplexer demultiplexes the wavelengths and forwards the traffic in each wavelength to a corresponding receiver 618. Receiver(s) 618 receive the traffic and processes it.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

As illustrated in FIGS. 2 and 4 above, upstream traffic may be routed at an RN through a multiplexer, as opposed to a power splitter, to decrease the power loss experienced by the upstream traffic, thereby extending reach in the PON. Typical multiplexers can properly receive traffic at a particular input port in only a certain set of one or more wavelengths. As an example only, a typical 1×4 multiplexer may only be able to direct upstream traffic at low loss if the traffic in $\lambda_1$ is received at a first port, the traffic in $\lambda_2$ is received at a second port, the traffic in $\lambda_3$ is received at a third port, and the traffic in $\lambda_4$ is received at a fourth port. Thus, for proper upstream transmission to take place, each of the multiplexer's input ports should be connected to downstream ONUs that transmit at the appropriate wavelength (or set of wavelengths) for that input port. One challenge that network operators may face when implementing a PON that routes upstream WDM traffic through a multiplexer at the RN is notifying whoever is deploying an ONU at a particular point in the network about the type of ONU that should be deployed at that point (i.e., the ONU transmitting at the proper upstream wavelength).

Figure 5:
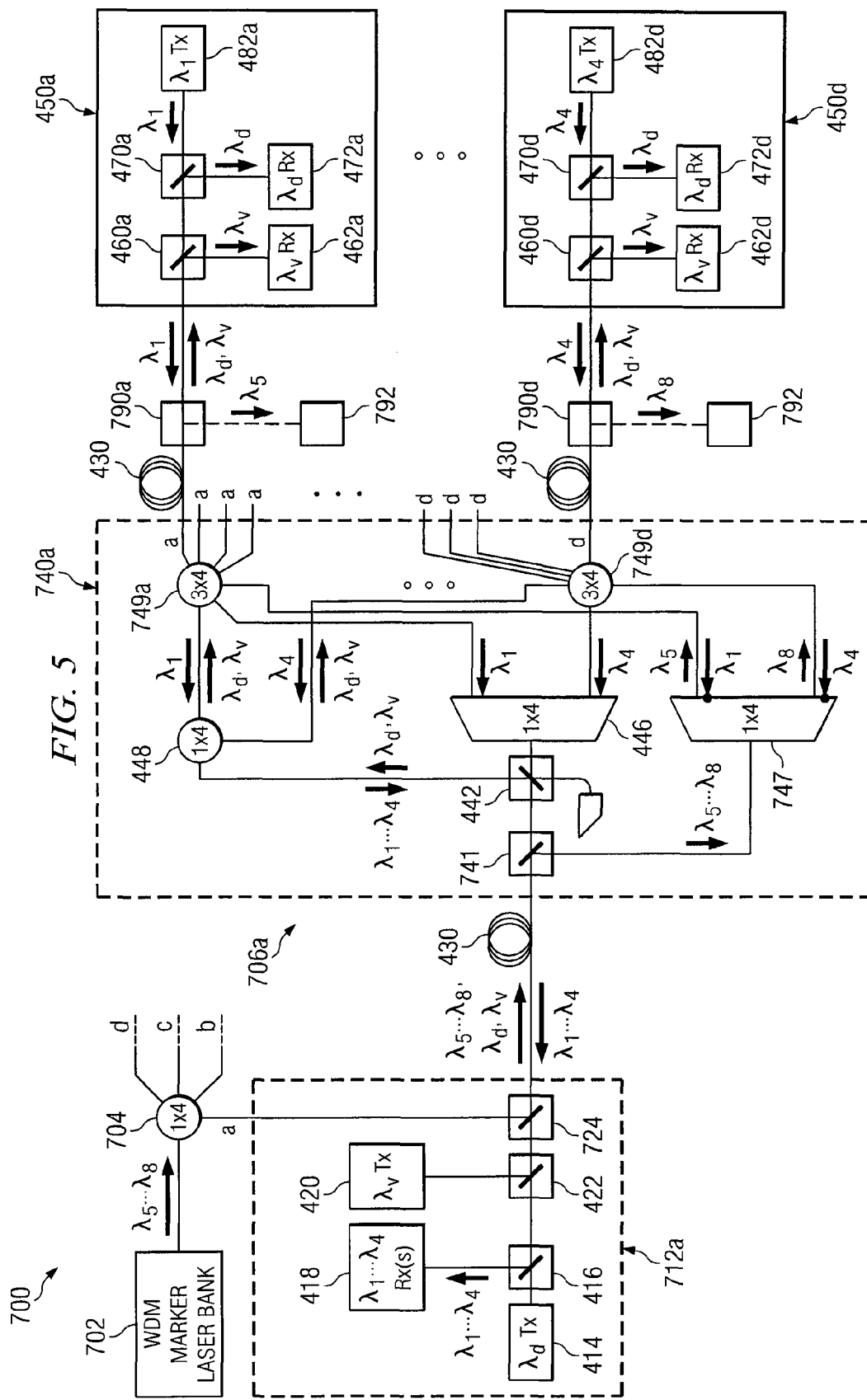
FIG. 5 is a diagram illustrating an example PON system transmitting optical markers downstream to indicate proper placement of ONUs according to a particular embodiment of the invention.

FIG. 5 is a diagram illustrating an example PON system 700 transmitting optical markers downstream to indicate proper placement of ONUs 450 according to a particular embodiment of the invention. PON system 700 comprises WDM marker laser bank 702, splitter 704, and PSPONs 706a, 706b (not illustrated), 706c (not illustrated), and 706d (not illustrated). To indicate proper placement of ONUs 450 in a PSPON 706, WDM marker laser bank 702 transmits a set of marker wavelength signals, at bands $\lambda_5$-$\lambda_8$, downstream to each PSPON 706. Each downstream marker wavelength signal is routed in each PSPON 706 to different points in the network and corresponds to a particular upstream wavelength that can be transmitted at that point in the network. The type of ONU 450 that can be deployed at that point in the network is determined based on the marker wavelength signal routed to that point in the network.

WDM marker laser bank 702 may reside at a central office in particular embodiments or in a module external to the central office in alternative embodiments. Within the central office, WDM marker laser bank 702 may reside in a module external to OLTs 712 of PSPONs 706 (as illustrated) or on the same OLT card as one or more OLTs 712 in alternative embodiments. WDM marker laser bank 702 comprises a set of transmitters (not illustrated) operable to transmit at marker wavelength bands $\lambda_5$-$\lambda_8$. In particular embodiments, these transmitters may be relatively weak (i.e., inexpensive), as the $\lambda_5$-$\lambda_8$ signals need only act as markers and not carry traffic in these embodiments. In alternative embodiments, these transmitters may be stronger, and, in particular ones of these embodiments, traffic may be modulated on the $\lambda_5$-$\lambda_8$ signals. As described further below, detecting the modulated optical traffic on an optical marker signal may be less expensive than detecting the marker wavelength itself in particular embodiments.

In particular embodiments, traffic modulated on a particular optical marker signal may comprise a particular tone that identifies the marker signal itself (e.g., its wavelength), the upstream wavelength that corresponds to the marker signal, and/or the ONU type transmitting at the upstream wavelength corresponding to the marker signal. In these embodiments, one or more modulators (not illustrated) modulating the marker signal may reside in any suitable location, such as, for example, at laser bank 702. In alternative embodiments, traffic modulated on a particular marker signal may identify one or more additional PON-specific characteristics, such as, for example, a particular PON's OLT identification or any other suitable management information. In these embodiments, one or more modulators may modulate the PON-specific characteristics on a marker signal for the particular PON. These modulators may reside at laser bank 702, at an OLT 712 of the particular PON itself, or in any other suitable location. It should be noted that any suitable type of modulation may be used, including, for example, amplitude modulation, frequency/wavelength modulation, and phase modulation. In addition, a signal may be modulated using one or more types of modulation and/or may be modulated one or more times using the same type of modulation (e.g., using frequency/wavelength modulation). Additionally, modulation may be performed using any suitable device and/or technique including, for example, fiber modulation.

In addition to comprising $\lambda_5$-$\lambda_8$ transmitters, WDM laser bank 702 may also comprise a multiplexer or any other suitable combiner operable to combine $\lambda_5$-$\lambda_8$ into one signal and forward the traffic to splitter 704. It should be noted that $\lambda_5$-$\lambda_8$ may (but need not) be the same as $\lambda_1$-$\lambda_4$ transmitted in the downstream direction in FIGS. 3 and 4. Also, $\lambda_5$-$\lambda_8$ may (but need not) be the same as $\lambda_1$-$\lambda_4$ transmitted in the upstream direction in FIGS. 2 and 5 and/or $\lambda_5$-$\lambda_8$ transmitted in the upstream direction in FIG. 4. It should also be noted that, although only four wavelengths are illustrated, WDM marker laser bank 702 may comprise any suitable number of transmitters and may transmit at any suitable number of marker wavelengths. It should further be noted that, in particular embodiments, an amplifier (not illustrated) may be connected to WDM laser bank 702 to boost the power of the wavelengths.

Splitter 704 may reside at a central office in particular embodiments or in a module external to the central office in alternative embodiments. Within the central office, splitter 704 may reside in a module external to OLTs 712 of PSPONs 706 (as illustrated) or on the same OLT card as one or more OLTs 712 in alternative embodiments. Splitter 704 comprises any suitable splitter, such as a coupler, operable to receive the signal comprising marker wavelengths $\lambda_5$-$\lambda_8$ from WDM marker laser bank 702 (or optionally, from an amplifier positioned downstream of WDM marker laser bank 702) and split the signal into four copies. Splitter 704 is further operable to forward each copy of the marker wavelengths to a corresponding downstream PSPON 706.

It should be noted that, in the illustrated embodiment, WDM laser bank 702 may be used in conjunction with multiple PSPONs 706a-706d for, e.g., cost-sharing purposes. In alternative embodiments, WDM laser bank 702 may be used in conjunction with any other suitable number of PSPONs, including a single PSPON 706. In embodiments in which WDM laser bank 702 is used in conjunction with a single PSPON 706, splitter 704 need not be used. It should also be noted that PSPONs 706b-706d are not illustrated for the sake of clarity and may be similar to PSPON 706a, which is illustrated.

Each PSPON 706 comprises an OLT 712, optical fiber 430, an RN 740, port module 790, identification device 792, and ONUs 450. Each OLT 712 comprises transmitter 414, filter 416, receiver(s) 418, transmitter 420, filter 422, and filter 724. Transmitter 414, filter 416, receiver(s) 418, transmitter 420, and filter 422 have been described above in conjunction with FIG. 2 and thus will not be described again in detail. It should be noted that, in particular embodiments, OLT 712 may also comprise any suitable amplifier (not illustrated) operable to increase the reach of downstream traffic.

Filter 724 is operable to receive the combined traffic in $\lambda_d$ and $\lambda_v$ from filter 422 and a copy of the signal comprising marker wavelengths $\lambda_5$-$\lambda_8$ from splitter 704, combine the two signals into one signal, and direct the signal comprising traffic in $\lambda_d$ and $\lambda_v$ and $\lambda_5$-$\lambda_8$ to a corresponding RN 740. In the upstream direction, filter 724 is operable to receive the traffic in $\lambda_1$-$\lambda_4$ from the corresponding RN 740 and direct the traffic in $\lambda_5$-$\lambda_8$ to filter 422. It should be noted that, in alternative embodiments, filter 724 may comprise any other suitable filter and may be placed in any other suitable location in PON 706a, such as, for example, between filters 416 and 422. Optical fiber 430 has been described above in conjunction with FIG. 2 and thus will not be described again in detail.

Each RN 740 comprises filter 442, multiplexer 446, primary power splitter 448, filter 741, multiplexer 747, and secondary power splitters 749a-749d. Filter 442, multiplexer 446, and primary power splitter 448 have already been described above in conjunction with FIG. 2 and thus will not be described again in detail. Filter 741 may comprise any suitable filter operable to receive the signal comprising traffic in $\lambda_d$ and $\lambda_v$ and $\lambda_5$-$\lambda_8$ from OLT 712, direct the traffic in $\lambda_d$ and $\lambda_v$ to filter 442, and direct $\lambda_5$-$\lambda_8$ to multiplexer 747. In the upstream direction, filter 741 is operable to receive the traffic in $\lambda_1$-$\lambda_4$ from filter 442 and direct the traffic to OLT 712. In particular embodiments, filter 741 may additionally receive upstream traffic in $\lambda_1$-$\lambda_4$ from multiplexer 747 and terminate the traffic in any suitable manner.

Multiplexer 747 may comprise any suitable multiplexer/demultiplexer operable to receive the marker signal in $\lambda_5$-$\lambda_8$, demultiplex the wavelengths, and forward each marker signal in a corresponding wavelength from a corresponding output port to a corresponding secondary power splitter 749. Thus, for example, the signal in $\lambda_5$ may be forwarded from a first port to secondary power splitter 749a, the signal in $\lambda_6$ may be forwarded from a second port to secondary power splitter 749b (not illustrated), the signal in $\lambda_7$ may be forwarded from a third port to secondary power splitter 749c (not illustrated), and the signal in $\lambda_8$ may be forwarded from a fourth port to secondary power splitter 749d. In the upstream direction, multiplexer 747 may receive a copy of $\lambda_1$-$\lambda_4$ from secondary power splitters 749a-749d, respectively, and terminate the traffic (or forward the traffic to filter 741 for suitable termination in particular embodiments).

It should be noted that, in particular embodiments, multiplexer 747 may receive downstream signals in any other suitable number of marker wavelengths (than those illustrated) and may route the marker signals from any suitable set of output ports. For example, in particular embodiments, multiplexer 747 may comprise a cyclic multiplexer or may comprise a greater number of ports. Also, although multiplexer 747 comprises a single multiplexer in the illustrated embodiment, in alternative embodiments, multiplexer 747 may comprise two or more separate multiplexers receiving marker wavelengths from one or more upstream sources and forwarding the traffic downstream. Also, multiplexers 446 and 747 may comprise a single multiplexer in particular embodiments.

Each secondary power splitter 749 may comprise any suitable splitter, such as a coupler, operable to receive a copy of the traffic in $\lambda_d$ and $\lambda_v$ from primary power splitter 448 and a signal in a corresponding one of $\lambda_5$-$\lambda_8$ from multiplexer 747, combine the two signals into one signal, split the signal into a suitable number of copies, and forward each copy to a corresponding downstream ONU 450. In the upstream direction, each secondary power splitter 749 is operable to receive time-shared traffic in a corresponding one of $\lambda_1$-$\lambda_4$ from a corresponding set of downstream ONUs 450, combine the traffic into one signal, split the signal into three copies, and forward one copy to primary power splitter 448, one copy to multiplexer 446, and one copy to multiplexer 447. Although secondary power splitters 749 comprise 3×4 couplers in the illustrated embodiment, in alternative embodiments, secondary power splitters 749 may comprise any other suitable coupler or combination of couplers.

Each port module 790 may comprise any suitable port and/or fiber operable to couple to an identification device 792 and allow identification device to identify the marker signal at that point in the network. Port module 790 may also allow the traffic in $\lambda_d$ and $\lambda_v$ to pass in the downstream direction and the traffic in a corresponding one of $\lambda_1$-$\lambda_4$ to pass in the upstream direction, during regular use and/or while coupled to identification device 792. In particular embodiments, port module 790 may further allow the corresponding marker signal, in one of $\lambda_5$-$\lambda_8$, to pass in the downstream direction (when module 790 is not coupled to device 792). If the marker signal is sufficiently weak, ONUs 450 may receive it without any significant disruption in reception of $\lambda_d$ and $\lambda_v$ or in transmission of one of $\lambda_1$-$\lambda_4$. If the marker signal is not sufficiently weak, a blocking filter may be placed in any suitable location downstream of port module 790 to block the marker signal's wavelength (including, for example, in each ONU 450). In particular embodiments, each port module 790 may comprise a filter operable to direct the signal in the corresponding one of $\lambda_5$-$\lambda_8$ toward the port (and not toward the downstream ONU location) and to pass the traffic in $\lambda_d$ and $\lambda_v$ and the corresponding one of $\lambda_1$-$\lambda_4$.

Each port module 790 may reside in any suitable location in the PSPON 706. For example, in the illustrated embodiment, port module 790 is coupled to a fiber branch upstream to a particular ONU location and receives the marker signal corresponding to that ONU location. In particular ones of these embodiments, port module 790 may comprise a bare fiber end or fiber connector (or any suitable tap, as illustrated) at an ONU location that couples to identification device 792 during testing, is decoupled from identification device 792 after testing, and then is coupled to an ONU 450 of the proper ONU type. In alternative ones of these embodiments, port module 790 may comprise a fiber end or connector (or any suitable tap, as illustrated) remote from an ONU location that couples to identification device 792 during testing, is decoupled from identification device 792 after testing, and then is coupled to a fiber connector upstream of an ONU location that couples to the ONU 450 of the proper ONU type. In alternative embodiments, port module 790 may be coupled to a plurality of fiber branches (e.g., branches "a" extending from secondary power splitter 749a) and may receive the marker signal corresponding to ONU locations downstream of those fiber branches. In particular ones of these embodiments, port module 790 may reside in RN 740.

Identification device 792 may comprise any suitable device operable to be coupled to port module 790, receive a corresponding marker signal, in one of $\lambda_5$-$\lambda_8$, and identify the upstream wavelength that should be transmitted by an ONU 450 (or group of ONUs 450) at a corresponding point(s) in the network. In particular embodiments, identification device 792 may comprise a stand-alone device that may be coupled to a port module 790. In alternative embodiments, identification device 792 may be part of port module 790.

In particular embodiments, identification device 792 may comprise a photodiode (or any other suitable detector) and exchangeable blocking filters positionable in front of the photodiode. Based on the blocking filter from which the marker wavelength is uniquely directed to the photodiode (or based on the blocking filter from which the marker wavelength is uniquely not directed to the photodiode), identification device 792 may determine the identity of the received marker signal (e.g., its corresponding wavelength), the proper upstream wavelength that should be transmitted at a corresponding ONU location(s) in the network, and/or the proper ONU type that should be deployed at the ONU location(s). In particular embodiments, identification device 792 may then display the identity of the optical marker signal, the identity of the upstream wavelength, and/or the identity of the type of ONU transmitting at the upstream wavelength.

In alternative embodiments, identification device 792 may comprise multiple photodiodes (or any other suitable detector) and a demultiplexer configured to route each marker signal to a corresponding photodiode. Based on what photodiode detects the marker signal, identification device 792 may determine the identity of the received marker signal (e.g., its corresponding wavelength), the proper upstream wavelength that should be transmitted at a corresponding ONU location(s) in the network, and/or the proper ONU type that should be deployed at the ONU location(s). In particular embodiments, identification device 792 may then display the identity of the optical marker signal, the identity of the upstream wavelength, and/or the identity of the type of ONU transmitting at the upstream wavelength.

In yet alternative embodiments, identification device 792 may comprise a single receiver and a processing unit operable to interpret modulation of the marker signal. In these embodiments, each marker signal may be modulated with a parameter (e.g., a frequency pattern such as a tone) identifying the parameter, the marker signal's corresponding wavelength, the upstream wavelength corresponding to the marker signal, the ONU type transmitting at the corresponding upstream wavelength, and/or suitable PON-specific characteristics such as, for example, an OLT identification. In particular embodiments, identification device 792 may interpret the modulated parameter and display the identity of the parameter, the identity of the marker signal's corresponding wavelength, the identity of the upstream wavelength corresponding to the marker signal, the identity of the ONU type transmitting at the corresponding upstream wavelength, and/or the identity of any suitable PON-specific characteristic. In alternative embodiments, each marker signal may be modulated with data traffic identifying the marker signal's corresponding wavelength, the upstream wavelength corresponding to the marker signal, the ONU type transmitting at the corresponding upstream wavelength, and/or suitable PON-specific characteristics. In particular of these embodiments, identification device 792 may display the identity of the optical marker signal, the identity of the upstream wavelength, the identity of the type of ONU transmitting at the upstream wavelength, and/or the identity of any suitable PON-specific characteristic. In alternative embodiments, the proper upstream wavelength that should be transmitted at a particular point in the PSPON (i.e., the proper ONU type) may be identified in any other suitable manner.

As discussed above, in particular embodiments, identification device 792 may comprise a stand-alone device that can be plugged and unplugged from the PSPON 706. In particular ones of these embodiments, an ONU deployer may carry identification device 792 and use device 792 at any port module 790 in any PSPON 706 to determine the ONU type that should be deployed at a corresponding ONU location. Thus, for example, identification device 792 may be used to determine that ONUs 450a (transmitting upstream traffic at $\lambda_1$) should be deployed downstream of fiber branches "a" when a marker signal in $\lambda_5$ is detected at port module 790a, that ONUs 450b (transmitting upstream traffic at $\lambda_2$) should be deployed downstream of fiber branches "b" when a marker signal in $\lambda_6$ is detected at port module 790b (not illustrated), that ONUs 450c (transmitting upstream traffic at $\lambda_3$) should be deployed downstream of fiber branches "c" when a marker signal in $\lambda_7$ is detected at port module 790c (not illustrated), and that ONUs 450d (transmitting upstream traffic at $\lambda_4$) should be deployed downstream of fiber branches "d" when a marker signal in $\lambda_8$ is detected at port module 790d. In particular embodiments, identification device 792 need not disrupt the traffic being transmitted in the PSPON (besides the marker wavelength) while coupled to PSPON 706.

ONUs 450 have been described above in conjunction with FIG. 2 and thus will not be described again. However, it should be noted that, in particular embodiments, ONUs 450 may receive a corresponding marker signal during use (when the marker signal is not being tested by an identification device 792). In such embodiments, reception of traffic in $\lambda_v$ and $\lambda_d$ and transmission of traffic in a corresponding one of $\lambda_1$-$\lambda_4$ will not be distorted provided that the marker signal is of sufficiently low power. If not, each ONU 450 may comprise a blocking filter to block the marker wavelength (or, alternatively, a blocking filter may be placed in any suitable location upstream of the ONU). It should also be noted that, in particular embodiments, ONUs 450 of FIG. 5 may use preamplifiers to increase the power of upstream signals.

It should be noted that WDM marker laser bank 702 need not be used to transmit markers in an HPON that transmits multiple downstream and upstream, WDM wavelengths, such as, for example, in HPON 600 of FIG. 4. Assuming that the downstream and upstream wavelengths correspond to the same sets of ONUs, a deployer of ONUs may identify the type of ONU to deploy at a particular ONU location by identifying the downstream WDM wavelength being received at that location. Where downstream and upstream wavelengths are asymmetrical in an HPON, network operators may optionally continue to use WDM marker laser bank 702 to transmit markers. It should also be noted that, in particular embodiments, a particular PSPON 706 may be upgraded to an HPON, such as, for example, to HPON 600 of FIG. 4. In particular ones of such embodiments, WDM laser bank 702 may be disconnected from any other PSPONs 706, and the transmitters in WDM laser bank 702 may be reused as downstream transmitters in the HPON.

In operation, in the downstream direction, transmitters at WDM laser bank 702 transmit marker signals at wavelengths $\lambda_5$-$\lambda_8$, and a multiplexer at WDM laser bank 702 combines the signals into one signal and forwards the combined signal to splitter 704. Splitter 704 receives the signal, splits the signal into four copies, and forwards each copy to a corresponding PSPON 706.

At PSPON 706a, transmitters 414 and 420 transmit traffic at $\lambda_d$ and $\lambda_v$, respectively. Filter 416 receives the traffic in $\lambda_d$ and directs the traffic to filter 422. Filter 422 receives the traffic in $\lambda_d$ from filter 416 and the traffic in $\lambda_v$ from transmitter 420, combines the two signals into one signal, and forwards the combined signal to filter 724. Filter 724 receives the copy of marker signals in $\lambda_5$-$\lambda_8$ from splitter 704 and the traffic in $\lambda_d$ and $\lambda_v$ from filter 422, combines the two signals into one signal, and forwards the combined signal to RN 740a over fiber 430.

At RN 740a, filter 741 receives the marker signals in $\lambda_5$-$\lambda_8$ and the traffic in $\lambda_d$ and $\lambda_v$ from OLT 712a, directs the marker signals in $\lambda_5$-$\lambda_8$ to multiplexer 747, and directs the traffic in $\lambda_d$ and $\lambda_v$ to filter 442. Filter 442 receives the traffic in $\lambda_d$ and $\lambda_v$ from filter 741 and directs the traffic to primary power splitter 448.

Multiplexer 747 receives the marker signals in $\lambda_5$-$\lambda_8$, separates the signals, and forwards each signal in a particular wavelength to a corresponding secondary power splitter 749. Primary power splitter 448 receives the traffic in $\lambda_d$ and $\lambda_v$, splits the traffic into four copies, and forwards each copy to a corresponding secondary power splitter 749.

Each secondary power splitter 749 receives the signal in a corresponding one of $\lambda_5$-$\lambda_8$ from multiplexer 747 and a copy of the traffic in $\lambda_d$ and $\lambda_v$ from primary power splitter 448, combines the two signals, splits the combined signal into four copies, and forwards each resulting copy downstream to a corresponding port module 790a. Each port module 790a receives the marker signal comprising a corresponding one of $\lambda_5$-$\lambda_8$ and the traffic in $\lambda_d$ and $\lambda_v$, directs the marker signal to identification device 792 when device 792 is coupled to port module 790, directs the marker signal to the downstream ONU 450 or ONU location (or blocking filter) when device 792 is not coupled to port module 790, and directs the traffic in $\lambda_d$ and $\lambda_v$ to the downstream ONU 450 or ONU location (if an ONU has not yet been deployed).

When identification device 792 is coupled to port module 790, identification device 792 receives the marker signal and determines the identity of the marker signal (e.g., its corresponding wavelength), the identity of the upstream wavelength that can be transmitted at a corresponding ONU location, and/or the ONU type that can be deployed at that location. In particular embodiments, identification device 792 interprets modulation of the marker signal to identify a modulated parameter corresponding to the marker signal, the upstream wavelength that can be transmitted at a corresponding ONU location, the ONU type that can be deployed at that location, and/or any PON-specific characteristic. Identification device 792 may display one or more of these results. An ONU 450 of the particular ONU type may then be deployed at the corresponding ONU location.

Once deployed, an ONU 450 may receive the traffic in $\lambda_d$ and $\lambda_v$ at filter 460, and filter 460 may direct the traffic in $\lambda_v$ to receiver 462 and the traffic in $\lambda_d$ to filter 470. Receiver 462 then receives and processes the traffic in $\lambda_v$. Filter 470 receives the traffic in $\lambda_d$ and directs the traffic to receiver 472, which receives and processes the traffic in $\lambda_d$.

In the upstream direction, sets of ONUs 450a-450d transmit at $\lambda_1$-$\lambda_4$, respectively. In particular embodiments, a single ONU 450 transmits traffic in a particular time-slot (and all of ONUs 450 time-share time-slots), thereby increasing reach. In alternative embodiments, an ONU of two or more sets of ONUs 450a-450d transmit in the same time-slot (and ONUs of each set time-share time-slots), thereby increasing reach and upstream bandwidth. Thus, in these embodiments, ONUs 450a time-share transmission at $\lambda_1$, ONUs 450b time-share transmission at $\lambda_2$ (not illustrated), ONUs 450c time-share transmission at $\lambda_3$ (not illustrated), and ONUs 450d time-share transmission at $\lambda_4$.

Each port module 790 receives the traffic in a corresponding one of $\lambda_1$-$\lambda_4$ from a downstream ONU 450 and directs the traffic to a corresponding secondary power splitter 749. Secondary power splitters 749a-749d receive the traffic in $\lambda_1$-$\lambda_4$, respectively. Each secondary power splitter 749 splits the received traffic into three copies and forwards one copy to multiplexer 446, one copy to multiplexer 747, and one copy to primary power splitter 448.

Multiplexer 446 receives a copy of the traffic in $\lambda_1$ at a first input port, a copy of the traffic in $\lambda_2$ at a second input port, a copy of the traffic in $\lambda_3$ at a third input port, and a copy of the traffic in $\lambda_4$ at a fourth input port. In the embodiments in which a single ONU 450 transmits per time-slot, multiplexer 446 receives the traffic and forwards the traffic to filter 442. In the embodiments in which an ONU of two or more sets of ONUs 450a-450d transmit in the same time slot at $\lambda_1$-$\lambda_4$, respectively, multiplexer 446 receives the traffic, combines the traffic, and forwards the traffic to filter 442.

Multiplexer 747 receives a copy of the traffic in $\lambda_1$ at a first input port, a copy of the traffic in $\lambda_2$ at a second input port, a copy of the traffic in $\lambda_3$ at a third input port, and a copy of the traffic in $\lambda_4$ at a fourth input port and terminates the traffic (or forwards the traffic to filter 741 for suitable termination). Primary power splitter 448 receives copies of the traffic in $\lambda_1$-$\lambda_4$ from secondary power splitters 749a-749d, respectively, combines the traffic into one signal (when traffic in a plurality of $\lambda_1$-$\lambda_4$ is transmitted per time-slot), and forwards the traffic to filter 442.

Filter 442 receives the traffic in the particular set of $\lambda_1$-$\lambda_4$ from multiplexer 446 and directs the traffic to filter 741. Filter 442 also receives the traffic in the particular set of $\lambda_1$-$\lambda_4$ from primary power splitter 448 and terminates this traffic in any suitable manner. Filter 741 receives the traffic in the particular set of $\lambda_1$-$\lambda_4$ from filter 442 and forwards the traffic to OLT 612. Filter 741 may also suitably terminate any traffic it receives from multiplexer 747.

Filter 724 of OLT 612 receives the traffic in the particular set of $\lambda_1$-$\lambda_4$ from RN 740 and directs the traffic to filter 422. Filter 422 receives the traffic in the particular set of $\lambda_1$-$\lambda_4$ from filter 724 and directs the traffic to filter 416. In the embodiments in which a single ONU 450 transmits per time-slot, filter 416 receives the traffic in the particular one of $\lambda_1$-$\lambda_4$ and forwards the traffic to receiver 418. In the embodiments in which an ONU in two or more sets of ONUs 450a-450d transmit in the same time-slot at $\lambda_1$-$\lambda_4$, respectively, filter 416 receives the traffic in the particular set of two or more wavelengths and forwards the traffic to a demultiplexer (not illustrated). The demultiplexer demultiplexes the wavelengths and forwards the traffic in each wavelength to a corresponding receiver 418. Receiver(s) 418 receives the traffic and processes it.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

Although the present invention has been described with several embodiments, various changes and modifications may be suggested to one skilled in the art. It is intended that the present invention encompass such changes and modifications as fall within the scope of the appended claims.

What is claimed is:

1. A method for transmitting optical markers in a passive optical network (PON) system, comprising:

transmitting a first optical marker signal, the first optical marker signal modulated to include information identifying an optical network unit (ONU) type configured to transmit at an upstream wavelength corresponding to the first optical marker signal;

transmitting a second optical marker signal, the second optical marker signal modulated to include information identifying an ONU type configured to transmit at an upstream wavelength corresponding to the second optical marker signal;

at a distribution node of the PON, routing the first optical marker signal to a first set of one or more optical fibers in the PON, each optical fiber corresponding to a first upstream wavelength;

at the distribution node of the PON, routing the second optical marker signal to a second set of one or more optical fibers in the PON, each optical fiber corresponding to a second upstream wavelength;

receiving either the first marker signal or the second marker signal at a location downstream of the distribution node, the location being a location at which an ONU is not coupled to the PON;

determining an ONU type identified in the received marker signal; and coupling an ONU to the PON based on the determined ONU type.

2. The method of claim 1, wherein each optical fiber is associated with a particular ONU location of the PON at which an ONU may be coupled.

3. The method of claim 1, wherein each optical fiber is associated with a plurality of ONU locations of the PON.

4. The method of claim 1, wherein each optical fiber is configured to couple to an identification device configured to identify at least one of an upstream wavelength corresponding to the first optical marker signal and an ONU type transmitting at the upstream wavelength corresponding to the first optical marker signal.

5. The method of claim 1, further comprising:
combining the first optical marker signal and the second optical marker signal into one signal;
splitting the signal comprising the first optical marker signal and the second optical marker signal into a plurality of copies; and
forwarding each copy comprising the first optical marker signal and the second optical marker signal to a corresponding PON of a plurality of PONs.

6. The method of claim 1, further comprising modulating at least one of the first optical marker signal and the second optical marker signal to include management information of the PON.

7. An identification device configured to:
be coupled to any one of a plurality of optical fibers of a passive optical network (PON) when an optical network unit (ONU) is not coupled to an ONU location, each optical fiber corresponding to at least one ONU location of the PON at which an ONU may be coupled;
receive an optical marker signal of a set of optical marker signals from the coupled optical fiber, the optical marker signal modulated to include information identifying an ONU type configured to transmit at an upstream wavelength corresponding to the optical marker signal; and
identify the ONU type configured to transmit at the upstream wavelength corresponding to the optical marker signal by interpreting the modulation on the optical marker signal.

8. The identification device of claim 7, further configured to display at least one of the identity of the upstream wavelength corresponding to the optical marker signal and the identity of the ONU type transmitting at the upstream wavelength corresponding to the optical marker signal.

9. A method for using an identification device, comprising:
coupling the identification device to any one of a plurality of optical fibers of a passive optical network (PON), each optical fiber corresponding to at least one optical network unit (ONU) location of the PON, the identification device being coupled to the ONU location when an ONU is not coupled to the ONU location;
receiving an optical marker signal of a set of optical marker signals from the coupled optical fiber, the optical marker signal modulated to include information identifying an ONU type configured to transmit at an upstream wavelength corresponding to the optical marker signal; and
identifying at least one of the upstream wavelength corresponding to the optical marker signal and the ONU type transmitting at the upstream wavelength corresponding to the optical marker signal by interpreting the modulation on the optical marker signal.

10. The method of claim 9, further comprising displaying at least one of the identity of the upstream wavelength corresponding to the optical marker signal and the identity of the ONU type transmitting at the upstream wavelength corresponding to the optical marker signal.

* * * * *